United States Patent
Imazato

(10) Patent No.: US 11,669,276 B2
(45) Date of Patent: Jun. 6, 2023

(54) RECORDING DEVICE REMOVAL DETECTION DEVICE, STORAGE MEDIUM, AND RECORDING DEVICE REMOVAL DETECTION METHOD

(71) Applicant: FUJITSU LIMITED, Kawasaki (JP)

(72) Inventor: Takashi Imazato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 82 days.

(21) Appl. No.: 17/338,004

(22) Filed: Jun. 3, 2021

(65) Prior Publication Data

US 2022/0019381 A1 Jan. 20, 2022

(30) Foreign Application Priority Data

Jul. 20, 2020 (JP) .............................. JP2020-123783

(51) Int. Cl.
*G06F 3/06* (2006.01)

(52) U.S. Cl.
CPC .......... *G06F 3/0659* (2013.01); *G06F 3/0604* (2013.01); *G06F 3/0664* (2013.01); *G06F 3/0688* (2013.01)

(58) Field of Classification Search
CPC .... G06F 3/0659; G06F 3/0604; G06F 3/0664; G06F 3/0688
See application file for complete search history.

(56) References Cited

U.S. PATENT DOCUMENTS

| | | | | |
|---|---|---|---|---|
| 2006/0080502 A1* | 4/2006 | Sakaki | .................. | G06F 3/0607 711/170 |
| 2006/0224751 A1* | 10/2006 | Kuwata | .................. | H04L 61/106 709/229 |
| 2007/0276992 A1* | 11/2007 | Chew | .................... | G06F 3/0689 711/112 |
| 2010/0131950 A1* | 5/2010 | Yamada | ................ | G06F 3/0635 718/1 |
| 2011/0238929 A1* | 9/2011 | Itoh | ....................... | G11B 27/002 711/E12.001 |
| 2016/0085472 A1* | 3/2016 | Takeuchi | .............. | G06F 3/0689 711/154 |
| 2019/0138209 A1* | 5/2019 | Benisty | ............... | G06F 12/0238 |
| 2020/0379668 A1* | 12/2020 | Akaike | .................... | G06F 3/067 |
| 2022/0066640 A1* | 3/2022 | Takeshita | .............. | G06F 3/0688 |
| 2022/0300176 A1* | 9/2022 | Smith | ................... | G06F 3/0622 |

FOREIGN PATENT DOCUMENTS

JP 2006-107257 A 4/2006
JP 2006-285597 A 10/2006

* cited by examiner

*Primary Examiner* — Ryan Bertram
(74) *Attorney, Agent, or Firm* — ArentFox Schiff LLP

(57) ABSTRACT

A storage control device, includes a memory; and a processor coupled to the memory and the processor configured to: when receiving a first response that includes first information from a control device, generate a second response that includes second information by converting the first response, transmit, to a host device, the second response, and when detecting that a first recording device is removed from a slot and a second recording device is mounted in the slot, update, by using the first information of the first recording device associated with the second information, the first information of the second recording device.

8 Claims, 32 Drawing Sheets

FIG. 5

Notification Acceptance Table(ST-CPU)     500

| HOSTNQN | Notification Acceptance |
|---------|-------------------------|
| HOST1...| YES                     |
| HOST2...| NO                      |

Discovery Log Collection Table(ST-DCNT)

| Slot | SSD Installation | Network Address | Physical SUBNQN | SUBNQN | Physical CNTLID | CNTLID | Associated HOSTNQN | Other (Port ID, etc) |
|---|---|---|---|---|---|---|---|---|
| Slot#0 | Present | 192.168.10.100 | 1234... | aaaa... | xxxx... | XXXX... | H1... | ********** |
| Slot#1 | Present | 192.168.10.101 | 5678... | bbbb... | yyyy... | YYYY... | H1... | ********** |
| ... | ... | ... | ... | ... | ... | ... | ... | ... |

FIG. 7

NVMe Drive Table(HOSt#1)

| Logical Drive | Network Address | SUBNQN | Other (Namespace ID, etc) |
|---|---|---|---|
| C:¥ | 192.168.10.100 | 1234... | ********* |
| D:¥ | 192.168.10.101 | 5678... | ********* |
| ... | ... | ... | ... |

FIG. 8

NVMe Drive Table(HOST#1)                                                               700

| Logical Drive | Network Address | SUBNQN  | CNTLID  | Other (Namespace ID, etc) |
|---------------|-----------------|---------|---------|---------------------------|
| None          | Not set         | Not set | Not set | Not set                   |
| None          | Not set         | Not set | Not set | Not set                   |

SET IN ADVANCE AT TIME OF SHIPPING
(IN CONFORMITY WITH NVMeoF SPECIFICATION)     600

Discovery Log Collection Table(ST-DCNT)

| Slot   | SSD Installation | Network Address | Physical SUBNQN | SUBNQN | Physical CNTLID | CNTLID | Associated HOSTNQN | Other (Port ID, etc) |
|--------|------------------|-----------------|-----------------|--------|-----------------|--------|--------------------|----------------------|
| Slot#0 | None             | Not set         | Not set         | aaaa...| Not set         | XXXX...| None               | Not set              |
| Slot#1 | None             | Not set         | Not set         | bbbb...| Not set         | YYYY...| None               | Not set              |
| ...    | ...              | ...             | ...             | ...    | ...             | ...    | ...                | ...                  |

FIG. 9

| Slot | SSD Installation | Network Address | Physical SUBNQN | SUBNQN | Physical CNTLID | CNTLID | Associated HOSTNQN | Other (Port ID, etc) |
|---|---|---|---|---|---|---|---|---|
| Slot#0 | None | 192.168.10.100 | Not set | aaaa... | Not set | XXXX... | None | Not set |
| Slot#1 | None | 192.168.10.101 | Not set | bbbb... | Not set | YYYY... | None | Not set |
| ... | ... | ... | ... | ... | ... | ... | ... | ... |

ADMINISTRATOR SETS ASSIGNED NETWORK ADDRESS TO EACH SLOT

| Slot | SSD Installation | Network Address | Physical SUBNQN | SUBNQN | Physical CNTLID | CNTLID | Associated HOSTNQN | Other (Port ID, etc) |
|---|---|---|---|---|---|---|---|---|
| Slot#0 | Present | 192.168.10.100 | Not set | aaaa... | Not set | XXXX... | None | Not set |
| Slot#1 | Present | 192.168.10.101 | Not set | bbbb... | Not set | YYYY... | None | Not set |
| ... | ... | ... | ... | ... | ... | ... | ... | ... |

MOUNTING STATUS

| Slot | SSD Installation | Network Address | Physical SUBNQN | SUBNQN | Physical CNTLID | CNTLID | Associated HOSTNQN | Other (Port ID, etc) |
|---|---|---|---|---|---|---|---|---|
| Slot#0 | Present | 192.168.10.100 | 1234... | aaaa... | xxxx... | XXXX... | None | ********** |
| Slot#1 | Present | 192.168.10.101 | 5678... | bbbb... | yyyy... | YYYY... | None | ********** |
| ... | ... | ... | ... | ... | ... | ... | ... | ... |

INSTALLED SSD Discovery INFORMATION IS SET  600

FIG. 13

| Slot | SSD Installation | Network Address | Physical SUBNQN | SUBNQN | Physical CNTLID | CNTLID | Associated HOSTNQN | Other (Port ID, etc) |
|---|---|---|---|---|---|---|---|---|
| Slot#0 | Present | 192.168.10.100 | 1234... | aaaa... | xxxx... | XXXX... | H1... | ********** |
| Slot#1 | Present | 192.168.10.101 | 5678... | bbbb... | yyyy... | YYYY... | H1... | ********** |
| ... | ... | ... | ... | ... | ... | ... | ... | ... |

600

HOSTNQN OF Association TARGET IS SET

FIG. 14

| Logical Drive | Network Address | SUBNQN | CNTLID | Other (Namespace ID, etc) |
|---|---|---|---|---|
| C:¥ | 192.168.10.100 | aaaa... | XXXX... | ********* |
| D:¥ | 192.168.10.101 | bbbb... | YYYY... | ********* |
| ... | ... | ... | ... | ... |

ASSIGNED LOGICAL DRIVE AFTER ESTABLISHMENT OF Association IS SET

MOUNTING STATUS
(DETECTION OF SSD ADDITION TO Slot#1)

600

| Slot | SSD Installation | Network Address | Physical SUBNQN | SUBNQN | Physical CNTLID | CNTLID | Associated HOSTNQN | Other (Port ID, etc) |
|---|---|---|---|---|---|---|---|---|
| Slot#0 | Present | 192.168.10.100 | 1234... | aaaa... | xxxx... | XXXX... | H2... | Not set |
| Slot#1 | Present | 192.168.10.101 | Not set | bbbb... | Not set | YYYY... | None | Not set |
| ... | ... | ... | ... | ... | ... | ... | ... | ... |

FIG. 22

EACH PIECE OF INFORMATION IS SET ON BASIS OF INSTALLED SSD Discovery INFORMATION    600

| Slot | SSD Installation | Network Address | Physical SUBNQN | SUBNQN | Physical CNTLID | CNTLID | Associated HOSTNQN | Other (Port ID, etc) |
|------|------------------|-----------------|-----------------|--------|-----------------|--------|--------------------|----------------------|
| Slot#0 | Present | 192.168.10.100 | 1234... | aaaa... | xxxx... | XXXX... | H2... | ********** |
| Slot#1 | Present | 192.168.10.101 | 5678... | bbbb... | yyyy... | YYYY... | None | ********** |
| ... | ... | ... | ... | ... | ... | ... | ... | ... |

FIG. 24

Notification Acceptance Table(ST-CPU) 500

| HOSTNQN | Notification Acceptance |
|---|---|
| HOST1... | YES |
| HOST2... | NO |

Discovery Log Collection Table(ST-DCNT) 600

| Slot | SSD Installation | Network Address | Physical SUBNQN | SUBNQN | Physical CNTLID | CNTLID | Associated HOSTNQN | Other (Port ID, etc) |
|---|---|---|---|---|---|---|---|---|
| Slot#0 | Present | 192.168.10.100 | 1234... | aaaa... | xxxx... | XXXX... | H1... | ********** |
| Slot#1 | Present | 192.168.10.101 | 5678... | bbbb... | yyyy... | YYYY... | H1... | ********** |
| ... | ... | ... | ... | ... | ... | ... | ... | ... |

FIG. 25

SSD REDUCTION RESULT IS SET
IF None, Discovery Log INFORMATION OF
REDUCED SSD IS NOT SUPPLIED TO HOST

600

| Slot | SSD Installation | Network Address | Physical SUBNQN | SUBNQN | Physical CNTLID | CNTLID | Associated HOSTNQN | Other (Port ID, etc) |
|---|---|---|---|---|---|---|---|---|
| Slot#0 | Present | 192.168.10.100 | 1234... | aaaa... | xxxx... | XXXX... | H1... | ********** |
| Slot#1 | None | 192.168.10.101 | 5678... | bbbb... | yyyy... | YYYY... | H1... | ********** |
| ... | ... | ... | ... | ... | ... | ... | ... | ... |

FIG. 27

NVMe Drive Table(HOSt#1) 700

| Logical Drive | Network Address | SUBNQN | Other (Namespace ID, etc) |
|---|---|---|---|
| C:¥ | 192.168.10.100 | 1234... | ********* |
| D:¥ | 192.168.10.101 | 5678... | ********* |
| ... | ... | ... | ... |

Notification Acceptance Table(ST-CPU) 500

| HOSTNQN | Notification Acceptance |
|---|---|
| HOST1... | YES |
| HOST2... | NO |

HOST SET WITH YES AND Associated HOSTITION IS NOTIFICATION DESTINATION OF REDUCTION NOTIFICATION INTERRUPT Discovery Log Collection Table(ST-DCNT) 600

| Slot | SSD Installation | Network Address | Physical SUBNQN | SUBNQN | Physical CNTLID | CNTLID | Associated HOSTNQN | Other (Port ID, etc) |
|---|---|---|---|---|---|---|---|---|
| Slot#0 | Present | 192.168.10.100 | 1234... | aaaa... | xxxx... | XXXX... | H1... | ********* |
| Slot#1 | Present | 192.168.10.101 | 5678... | bbbb... | yyyy... | YYYY... | H1... | ********* |
| ... | ... | ... | ... | ... | ... | ... | ... | ... |

FIG. 28

SSD REDUCTION RESULT IS SET
IF None, Discovery Log INFORMATION OF
REDUCED SSD IS NOT SUPPLIED TO HOST

600

| Slot | SSD Installation | Network Address | Physical SUBNQN | SUBNQN | Physical CNTLID | CNTLID | Associated HOSTNQN | Other (Port ID, etc) |
|---|---|---|---|---|---|---|---|---|
| Slot#0 | Present | 192.168.10.100 | 1234... | aaaa... | xxxx... | XXXX... | H1... | ********** |
| Slot#1 | None | 192.168.10.101 | 5678... | bbbb... | yyyy... | YYYY... | H1... | ********** |
| ... | ... | ... | ... | ... | ... | ... | ... | ... |

FIG. 29

WRITE SSD ADDITION RESULT

600

| Slot | SSD Installation | Network Address | Physical SUBNQN | SUBNQN | Physical CNTLID | CNTLID | Associated HOSTNQN | Other (Port ID, etc) |
|------|------------------|-----------------|-----------------|--------|-----------------|--------|--------------------|-----------------------|
| Slot#0 | Present | 192.168.10.100 | Not set | aaaa... | xxxx... | XXXX... | None | Not set |
| Slot#1 | Present | 192.168.10.101 | Not set | bbbb... | yyyy... | YYYY... | None | Not set |
| ... | ... | ... | ... | ... | ... | ... | ... | ... |

FIG. 30

SSD UNIQUE VALUE AFTER REPLACEMENT IS UPDATED,
AND SUBNQN SUPPLIED TO HOST IS UNCHANGED

600

| Slot | SSD Installation | Network Address | Physical SUBNQN | SUBNQN | Physical CNTLID | CNTLID | Associated HOSTNQN | Other (Port ID, etc) |
|---|---|---|---|---|---|---|---|---|
| Slot#0 | Present | 192.168.10.100 | 1234... | aaaa... | xxxx... | XXXX... | None | ********** |
| Slot#1 | Present | 192.168.10.101 | 9ABC... | bbbb... | zzzz... | YYYY... | None | ********** |
| ... | ... | ... | ... | ... | ... | ... | ... | ... |

RECORDING DEVICE REMOVAL DETECTION DEVICE, STORAGE MEDIUM, AND RECORDING DEVICE REMOVAL DETECTION METHOD

CROSS-REFERENCE TO RELATED APPLICATION

This application is based upon and claims the benefit of priority of the prior Japanese Patent Application No. 2020-123783, filed on Jul. 20, 2020, the entire contents of which are incorporated herein by reference.

FIELD

The embodiment discussed herein is related to a storage control device, a storage medium, and a storage control method.

BACKGROUND

Conventionally, there is non volatile memory express (NVMe) technology for accessing a non-volatile memory device via a peripheral component interconnect express (PCIe) interface that is used in a server device to be a host, a storage device, and the like. Furthermore, there is NVMe over fabrics (NVMeoF) technology that enables NVMe technology to be used over the network. The network is, for example, Ethernet (registered trademark), Fibre Channel, InfiniBand, and the like.

There is prior art in which, for example, a storage-device side creates a virtual device mapped to a real device, and a host side uses a virtual address held in the virtual device to access for inputting and outputting data. Furthermore, there is a technique in which, for example, by installing a device or software in which various types of information and the like such as network addresses are written before a network node is added to a network to which the host and the storage device are connected, the network node added later refers to the various types of information from the installed device or software at a time of system starting. For example, Japanese Laid-open Patent Publication No. 2006-107257, Japanese Laid-open Patent Publication No. 2006-285597, and the like are disclosed as related art.

SUMMARY

According to an aspect of the embodiments, a storage control device, includes a memory; and a processor coupled to the memory and the processor configured to: when receiving a first response that includes first information from a control device, generate a second response that includes second information by converting the first response, transmit, to a host device, the second response, and when detecting that a first recording device is removed from a slot and a second recording device is mounted in the slot, update, by using the first information of the first recording device associated with the second information, the first information of the second recording device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory view illustrating one example of storage contents in an NA table 500;

FIG. 6 is an explanatory view illustrating one example of storage contents in a DLC table 600;

FIG. 7 is an explanatory view illustrating one example of storage contents in an ND table 700;

FIG. 8 is an explanatory view (No. 1) illustrating one example of recognizing an SSD 160;

FIG. 9 is an explanatory view (No. 2) illustrating one example of recognizing the SSD 160;

FIG. 10 is an explanatory view (No. 3) illustrating one example of recognizing the SSD 160;

FIG. 11 is an explanatory view (No. 4) illustrating one example of recognizing the SSD 160;

FIG. 13 is an explanatory view (No. 6) illustrating one example of recognizing the SSD 160;

FIG. 14 is an explanatory view (No. 7) illustrating one example of recognizing the SSD 160;

FIG. 21 is an explanatory view (No. 2) illustrating one example of updating the DLC table 600 in response to addition of the SSD 160;

FIG. 22 is an explanatory view (No. 3) illustrating one example of updating the DLC table 600 in response to addition of the SSD 160;

FIG. 24 is an explanatory view (No. 1) illustrating one example of updating the DLC table 600 in response to reduction of the SSD 160;

FIG. 25 is an explanatory view (No. 2) illustrating one example of updating the DLC table 600 in response to reduction of the SSD 160;

FIG. 27 is an explanatory view (No. 1) illustrating one example of updating the DLC table 600 in response to replacement of the SSD 160;

FIG. 28 is an explanatory view (No. 2) illustrating one example of updating the DLC table 600 in response to replacement of the SSD 160;

FIG. 29 is an explanatory view (No. 3) illustrating one example of updating the DLC table 600 in response to replacement of the SSD 160;

FIG. 30 is an explanatory view (No. 4) illustrating one example of updating the DLC table 600 in response to replacement of the SSD 160;

DESCRIPTION OF EMBODIMENTS

However, in the related art, when active replacement of a non-volatile memory device is performed in the storage device, there is a problem of increasing a work error and a work load on an operator who operates and maintains the server device. For example, when active replacement of the non-volatile memory device is performed in the storage device, the operator needs to manually update an identifier for uniquely identifying the non-volatile memory device registered in the server device, which may lead to an increase in the work load and the work error.

In view of the above, it is desirable to reduce the work error and the work load on the operator when a recording medium is replaced.

Hereinafter, an embodiment of a storage control device and a storage control program will be described in detail with reference to the drawings.

(One Example of Storage Control Method According to Embodiment)

Figure 1:
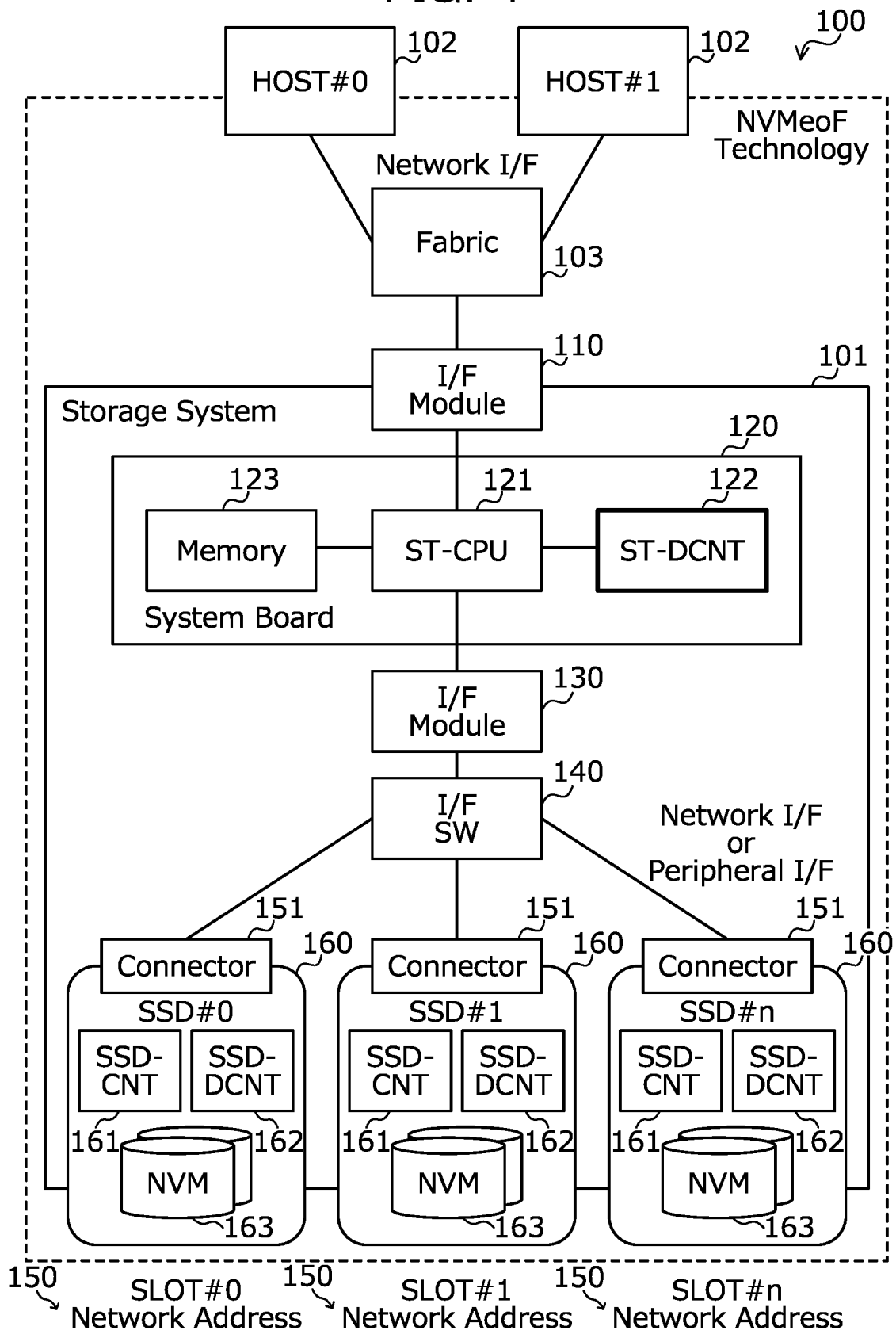
FIG. 1 is an explanatory diagram (No. 1) illustrating one example of a storage control method according to an embodiment.
Figure 2:
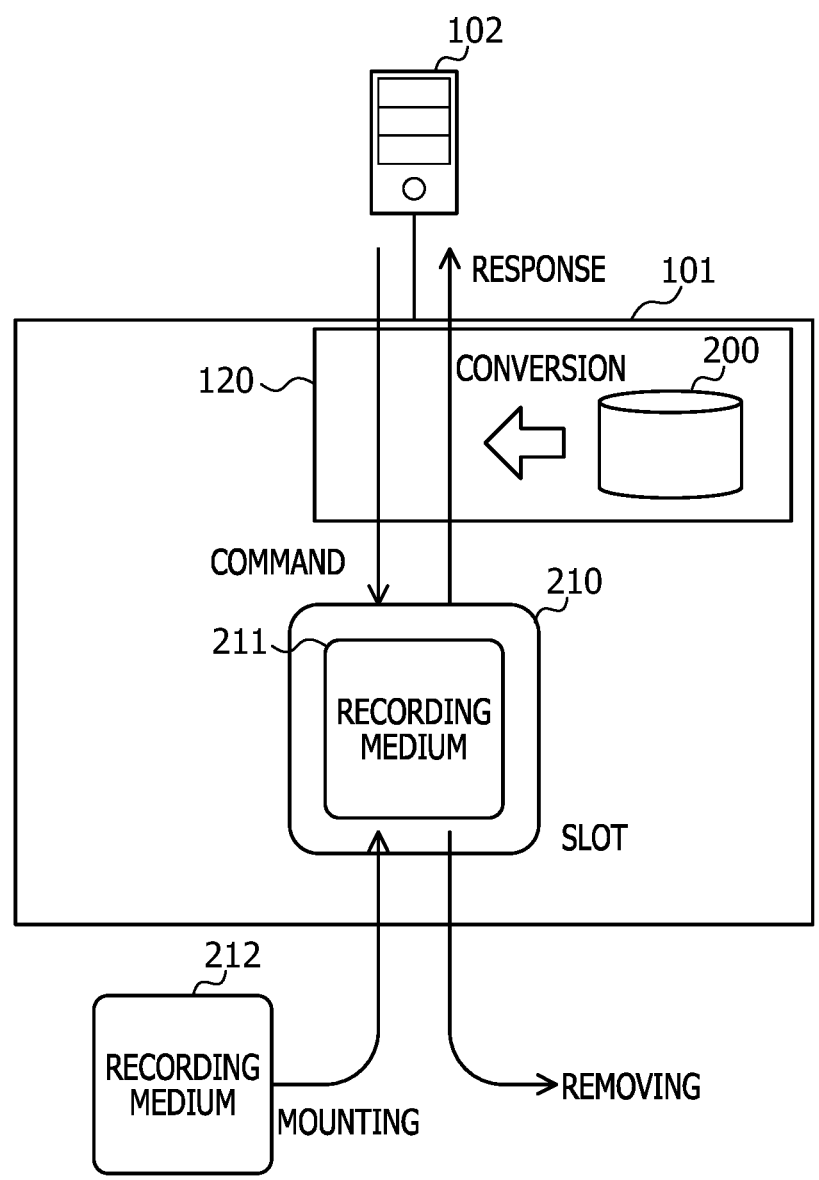
FIG. 2 is an explanatory diagram (No. 2) illustrating one example of the storage control method according to the embodiment.

FIGS. 1 and 2 are explanatory diagrams illustrating one example of a storage control method according to the embodiment. In FIG. 1, a storage control system 100 includes a storage control device 101 and one or more host devices 102.

The storage control device 101 is a computer to and from which a recording medium may be attached and detached. To and from the storage control device 101, for example, a solid state drive (SSD) may be attached and detached. The storage control device 101 connects to the host device 102. The host device 102 is a computer that connects to the storage control device 101 and uses the storage control device 101. The host device 102 is, for example, a server, a personal computer (PC), or the like.

The storage control device 101 includes an external interface (I/F) module 110, a system board 120, an I/F module 130 for a recording medium, an I/F switch 140, and one or more slots 150.

The system board 120 includes a storage-central processing unit (ST-CPU) 121, a storage-discovery controller (ST-DCNT) 122, and a memory 123. The slot 150 includes a connector 151.

The ST-CPU 121 is connected to the I/F module 110 and the I/F module 130. The I/F module 130 is connected to the connector 151 via the I/F switch 140. The I/F module 110 is connected to a network I/F of the host device 102 via a fabric 103.

The fabric 103 is a switching device corresponding to each network I/F. The switching device is, for example, an Ethernet switch, a Fibre Channel fabric, an InfiniBand switch, or the like.

The I/F module 110 is a component that performs protocol conversion between the network I/F and a bus I/F included in the system board 120.

The ST-CPU 121 is responsible for control of the entire storage control. The ST-CPU 121 controls RAID. The ST-CPU 121 controls data transfer between the host device 102 and an SSD 160. The ST-DCNT 122 is a controller that manages the SSD 160. The ST-DCNT 122 has a discovery function specified in NVMeoF specification.

The memory 123 includes, for example, a read only memory (ROM), a random access memory (RAM), a flash ROM, and the like. Specifically, for example, the flash ROM or the ROM stores various programs, and for example, the RAM is used as a work area for the ST-CPU 121. The programs stored in the memory 123 are loaded into the ST-CPU 121 to cause the ST-CPU 121 to execute coded processing.

The I/F module 130 is a component that performs protocol conversion between the network I/F and the bus I/F included in the system board 120. The I/F switch 140 is a component that controls switching of the network I/F or a peripheral I/F in the storage control device 101. The peripheral I/F is, for example, PCIe or the like.

The SSD 160 is a device that stores data. The SSD 160 includes an SSD-CNT 161, an SSD-DCNT 162, and an NVM 163. The SSD-CNT 161 is a controller that controls the SSD 160. The SSD-CNT 161 is a controller that controls data transfer. The SSD-DCNT 162 is a controller having a discovery function. The NVM 163 is a recording medium such as a non-volatile memory in which data is stored.

The storage control device 101 and the host device 102 use NVMeoF technology. In NVMeoF technology, each SSD 160 is assigned with a network address. On the basis of the network address, the host device 102 issues a command requesting data read, data write, or the like, to the SSD 160. For the network address, an IP address, a World Wide Name, or the like is used.

The network address of each SSD 160 is managed by the SSD-CNT 161 or the SSD-DCNT 162 mounted in each SSD 160. According to the NVMeoF specification, the host device 102 issues a discovery command to the storage control device 101 or the SSD-DCNT 162, and collects information indicating an available SSD 160, as a discovery log. The discovery log contains contents defined in the NVMeoF specification. The discovery log contains, for example, various IDs, transfer methods, network addresses, and the like. The host device 102 associates connection with the SSD 160 on the basis of the acquired discovery log, and assigns the SSD 160 to its own storage logical area.

NVMe technology and NVMeoF technology specify that a vendor of the SSD 160 sets identification information called NVM Subsystem NVMe Qualified Name (SUBNQN), which is unique to the SSD 160 worldwide, and a vendor-specific identifier called controller identifier (CNTLID). The host device 102 stores the SUBNQN and the CNTLID of the SSD 160 that may be used from the own device, and includes the SUBNQN and the CNTLID of the SSD 160 in some commands when accessing the SSD 160. The accessed SSD 160 collates the SUBNQN and the CNTLID instructed by the command with the own SUBNQN and CNTLID.

Here, when the SSD 160 mounted in the slot 150 is replaced, the SUBNQN and the CNTLID of the SSD 160 before the replacement and the SUBNQN of the SSD 160 after the replacement become different values. Therefore, conventionally, when the host device 102 accesses the SSD 160 after replacement, there is a situation where the SUBNQN and the CNTLID of the SSD 160 after the replacement do not match the stored SUBNQN and CNTLID, and the SSD 160 is disabled to be used. Therefore, it is desirable that an operator who operates and maintains the host device 102 manually rewrites the SUBNQN and the CNTLID of the SSD 160 stored in the host device 102, and performs work such as re-association to avoid the situation where the host device 102 is disabled to use the SSD 160. However, since the CNTLID is a vendor-specific identifier, there may also be a case where the value is not changed before and after replacement of the SSD 160.

However, there is a problem of increasing a work error and a work load on the operator and an administrator of the storage control device 101. For example, the administrator is to perform work for disabling the SSD 160 before replacement. Furthermore, the administrator is to perform work for replacing the SSD 160. Then, the operator is to perform work for collecting a SUBNQN of the SSD 160. Furthermore, the operator is to manually perform work of rewriting a SUBNQN of the SSD 160 stored in the host device 102. Then, the administrator is to perform work of enabling the SSD 160 after the replacement.

Furthermore, when the operator manually rewrites the SUBNQN of the SSD 160 stored in the host device 102, there is a possibility that an error may occur in which the SUBNQN of the SSD 160 stored in the host device 102 is rewritten to an incorrect value. For example, since the SUBNQN has a maximum of 233 bytes, it is easy to increase the work load and it is easy for an input error to occur.

Therefore, in the present embodiment, a description is given to a storage control method that may reduce a work error and a work load on the operator when a recording medium such as the SSD 160 is replaced. Here, with reference to FIG. 2, a description is given to a storage control method according to the present embodiment, which is applied to the storage control device 101 illustrated in FIG. 1.

In FIG. 2, the storage control device 101 has a slot 210 to and from which a recording medium may be attached and detached. The slot 210 corresponds to the slot 150 illustrated in FIG. 1. The recording medium corresponds to the NVM 163 illustrated in FIG. 1. The storage control device 101 has, for example, the slot 150 to and from which the SSD 160 including the NVM 163 may be attached and detached.

The storage control device 101 has a storage unit 200 that associates and stores actual identification information unique to the recording medium mounted in the slot 210, with virtual identification information that is commonly assigned to the recording medium mounted in the slot 210.

The virtual identification information is provided to the host device 102. The virtual identification information is a temporary SUBNQN. The storage unit 200 is realized by the memory 123 illustrated in FIG. 1. The actual identification information is, for example, a SUBNQN unique to the SSD 160 including the NVM 163 that is to be a recording medium 211. The storage unit 200 associates and stores, for example, the actual identification information unique to the recording medium 211 with the virtual identification information.

(2-1) When the storage control device 101 receives a command containing virtual identification information from the host device 102, the storage control device 101 converts the virtual identification information contained in the received command into actual identification information stored in the storage unit 200, in association with the virtual identification information. The storage control device 101 transmits the converted command to a control device that controls access to a recording medium mounted in the slot 210. The control device corresponds to, for example, the SSD-CNT 161 of the SSD 160 including the NVM 163 that is to be a recording medium mounted in the slot 210.

The storage control device 101 receives, for example, a command containing a temporary SUBNQN from the host device 102. Then, the storage control device 101 converts the temporary SUBNQN contained in the received command into the SUBNQN unique to the SSD 160 including the NVM 163. The storage control device 101 transmits the converted command to the SSD-CNT 161 of the SSD 160 including the NVM 163.

(2-2) The storage control device 101 receives a response that is for the transmitted command and contains the actual identification information stored in the storage unit 200, from a control device that controls access to a recording medium mounted in the slot 210. The storage control device 101 converts the actual identification information contained in the received response, into virtual identification information stored in the storage unit 200, in association with the actual identification information. The storage control device 101 transmits the converted response to the host device 102.

For example, the storage control device 101 receives a response that is for a command and contains a SUBNQN unique to the SSD 160 including the NVM 163, from the SSD-CNT 161 of the SSD 160 including the NVM 163. Then, the storage control device 101 converts the SUBNQN that is unique to the SSD 160 including the NVM 163 and contained in the received response, into a temporary SUBNQN. The storage control device 101 transmits the converted response to the host device 102.

(2-3) The storage control device 101 detects that a recording medium has been removed from the slot 210 and another recording medium has been mounted. When detecting, the storage control device 101 updates actual identification information that is unique to the recording medium removed from the slot 210 and is stored in the storage unit 200 in association with the virtual identification information, to actual identification information unique to the recording medium mounted in the slot 210.

In the example of FIG. 1, the storage control device 101 detects that the recording medium 211 has been removed from the slot 210 and a recording medium 212 has been mounted. When the storage control device 101 detects that the recording medium 211 has been removed and the recording medium 212 has been mounted, the storage control device 101 updates actual identification information unique to the recording medium 211 stored in the storage unit 200 in association with the virtual identification information, to actual identification information unique to the recording medium 212. The updated actual identification information is, for example, a SUBNQN unique to the SSD 160 including the NVM 163 that is to be the recording medium 212.

This allows the storage control device 101 to enable the host device 102 to avoid recognizing replacement of a recording medium before and after replacement of the recording medium, and to continue to use the virtual identification information. Regardless of an update timing of storage contents of the storage unit 200, as long as the various processes described above in (2-1) are performed when a command from the host device 102 is received, the storage control device 101 can handle the command appropriately. Furthermore, regardless of an update timing of storage contents of the storage unit 200, as long as the various processes described above in (2-2) are performed when a response is received from a control device that controls access to a recording medium, the storage control device 101 can handle the response appropriately. Therefore, the storage control device 101 may reduce a work load on the operator and the administrator when the recording medium is replaced.

(Hardware Configuration Example of Host Device 102)

Next, with reference to FIG. 3, a hardware configuration example of the host device 102 will be described.

Figure 3:
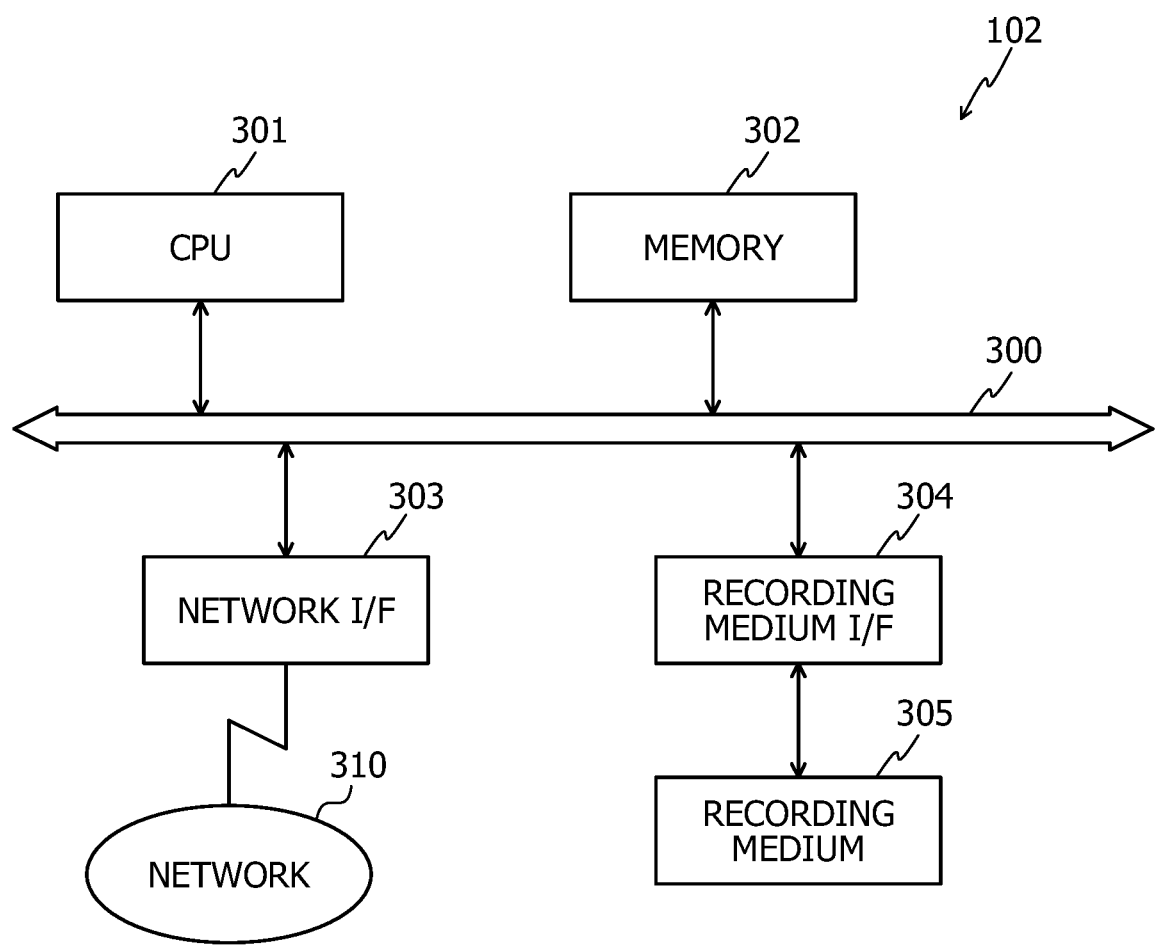
FIG. 3 is a block diagram illustrating a hardware configuration example of a host device 102.

FIG. 3 is a block diagram illustrating a hardware configuration example of the host device 102. In FIG. 3, the host device 102 includes a CPU 301, a memory 302, a network I/F 303, a recording medium I/F 304, and a recording medium 305. Furthermore, each of these components is individually connected by a bus 300.

Here, the CPU 301 performs overall control of the host device 102. The memory 302 includes, for example, a read only memory (ROM), a random access memory (RAM), a flash ROM, and the like. Specifically, for example, the flash ROM or the ROM stores various programs, and for example, the RAM is used as a work area for the CPU 301. The programs stored in the memory 302 are loaded into the CPU 301 to cause the CPU 301 to execute coded processing.

The network I/F 303 is connected to a network 310 through a communication line, and is connected to another computer through the network 310. Then, the network I/F 303 manages an interface between the network 310 and an inside, and controls input and output of data to and from another computer. The network I/F 303 is, for example, a modem, a local area network (LAN) adapter, or the like.

The recording medium I/F 304 controls read and write of data to and from the recording medium 305 under the control of the CPU 301. The recording medium I/F 304 is, for example, a disk drive, an SSD, a universal serial bus (USB) port, or the like. The recording medium 305 is a nonvolatile memory that stores data written under the control of the recording medium I/F 304. The recording medium 305 is, for example, a disk, a semiconductor memory, a USB memory, or the like. The recording medium 305 may be attached to and detached from the host device 102.

The host device 102 may further include, for example, a keyboard, a mouse, a display, a printer, a scanner, a microphone, a speaker, or the like in addition to the above-described components. Furthermore, the host device 102 may include a plurality of the recording medium I/F 304 and the recording medium 305. Furthermore, the host device 102 may omit the recording medium I/F 304 and the recording medium 305.

(Functional Configuration Example of Storage Control Device 101)

Next, with reference to FIG. 4, a functional configuration example of the storage control device 101 will be described.

Figure 4:
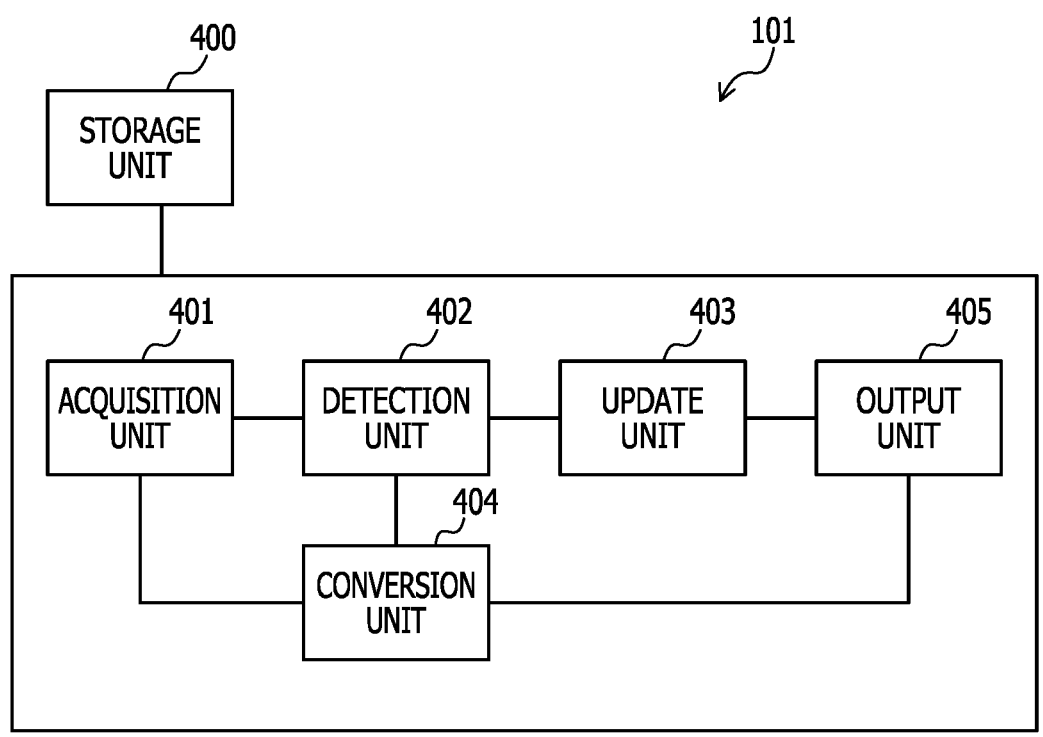
FIG. 4 is a block diagram illustrating a functional configuration example of a storage control device 101.

FIG. 4 is a block diagram illustrating a functional configuration example of the storage control device 101. The storage control device 101 includes a storage unit 400, an acquisition unit 401, a detection unit 402, an update unit 403, a conversion unit 404, and an output unit 405.

The storage unit 400 is realized by a storage area of the memory 123 and the like illustrated in FIG. 1, for example. Hereinafter, a case in which the storage unit 400 is included in the storage control device 101 will be described, but the embodiment is not limited to this case. For example, there may be a case where the storage unit 400 is included in a device different from the storage control device 101, and storage contents in the storage unit 400 may be referred to by the storage control device 101.

The acquisition unit 401 to the output unit 405 function as one example of a control unit. Specifically, for example, the acquisition unit 401 to the output unit 405 realize the function by causing the ST-CPU 121 to execute a program stored in a storage area of the memory 123 and the like illustrated in FIG. 1. A processing result of each function unit is stored in, for example, a storage area of the memory 123 or the like illustrated in FIG. 1.

The storage unit 400 stores various types of information referred to or updated in the processing of each function unit. The storage unit 400 associates and stores actual identification information unique to a recording medium mounted in the slot, with virtual identification information commonly assigned to the recording medium mounted in the slot. The virtual identification information is provided to the host device 102. The host device 102 utilizes NVMe technology and NVMeoF technology. The actual identification information is, for example, unique identification information assigned to a recording medium at the time of manufacturing the recording medium. The actual identification information is assigned to the recording medium by, for example, a vendor of the recording medium. The slot corresponds to, for example, the slot 150. The recording medium corresponds to, for example, the NVM 163. The virtual identification information is a virtual SUBNQN.

The storage unit 400 may further store identification information of a control device that controls access to a recording medium mounted in the slot, in association with the virtual identification information. The control device corresponds to, for example, the SSD-CNT 161 of the SSD 160 including the NVM 163 that is to be a recording medium.

The storage unit 400 associates and stores, for example, actual identification information unique to a recording medium mounted in the slot, with virtual identification information that is commonly assigned to a recording medium mounted in the slot. The actual identification information is, for example, an actual SUBNQN unique to the SSD 160 including the NVM 163 that is to be a recording medium. The actual identification information is, for example, unique identification information assigned to a recording medium at the time of manufacturing the recording medium.

The storage unit 400 may further store, for example, identification information of a control device that controls access to a recording medium mounted in the slot, in association with virtual identification information. The control device corresponds to the SSD-CNT 161. The control device corresponds to, for example, the SSD-CNT 161 of the SSD 160 including the NVM 163 that is to be a recording medium.

The storage unit 400 further stores an address commonly assigned to a recording medium mounted in the slot. The address is a network address. The address is provided to the host device 102. The storage unit 400 stores, for example, an address in association with the identification information for identifying the slot. The identification information for identifying the slot is, for example, a slot number assigned to the slot. Since the address is associated with the identification information for identifying the slot, the address is indirectly associated with actual identification information.

Specifically, the storage unit 400 stores a discovery log collection (DLC) table 600, which will be described later in FIG. 6.

The acquisition unit 401 acquires various types of information to be used for the processing of each function unit. The acquisition unit 401 stores the acquired various types of information in the storage unit 400 or outputs the acquired various types of information to each function unit. Furthermore, the acquisition unit 401 may output the various types of information stored in the storage unit 400 to each function unit. The acquisition unit 401 acquires the various types of information on the basis of, for example, a user's operation input. The acquisition unit 401 may receive the various types of information from a device different from the storage control device 101, for example.

The acquisition unit 401 acquires actual identification information unique to a recording medium. The acquisition unit 401 inquires, for example, actual identification information unique to a recording medium mounted in the slot at every predetermined timing, and acquires the actual identification information unique to the recording medium mounted in the slot by receiving from a control device that controls access to the recording medium. Specifically, the acquisition unit 401 acquires discovery information containing the actual SUBNQN unique to the SSD 160, by receiving the discovery information from the SSD-CNT 161 of the SSD 160.

The acquisition unit 401 acquires a command. The acquisition unit 401 acquires, for example, a command containing virtual identification information. The command contains, for example, virtual identification information as an access destination. Specifically, the acquisition unit 401 acquires the command containing the virtual identification information, by receiving from the host device 102. More specifically, the acquisition unit 401 acquires a command containing the virtual SUBNQN, by receiving from the host device 102. Specifically, the command is submission queue entry (SQE).

The acquisition unit 401 acquires, for example, a command that does not contain virtual identification information. Specifically, the acquisition unit 401 acquires the command that does not contain the virtual identification information, by receiving from the host device 102. More specifically, the acquisition unit 401 acquires a command that does not contain the virtual SUBNQN, by receiving from the host device 102.

The acquisition unit 401 acquires a response. The acquisition unit 401 acquires, for example, a response containing actual identification information unique to a recording medium. Specifically, the acquisition unit 401 acquires a response containing actual identification information unique to a recording medium, by receiving from a control device that controls access to the recording medium. More specifically, the acquisition unit 401 acquires a response containing the actual SUBNQN unique to the SSD 160, by receiving from the SSD-CNT 161 of the SSD 160. Specifically, the response is completion queue entry (CQE).

The acquisition unit 401 acquires, for example, a response that does not contain actual identification information unique to a recording medium. Specifically, the acquisition unit 401 acquires the response that does not contain the actual identification information unique to the recording medium, by receiving from a control device that controls access to the recording medium. More specifically, the acquisition unit 401 acquires a response that does not contain actual SUBNQN unique to the SSD 160, by receiving from the SSD-CNT 161 of the SSD 160.

The acquisition unit 401 may accept a start trigger to start processing of any of the function units. The start trigger is, for example, performing a predetermined operation input by the user. The start trigger may be, for example, receiving predetermined information from another computer. The start trigger may be, for example, outputting predetermined information by any of the function units.

For example, the acquisition unit 401 may accept that discovery information has been acquired, as a start trigger for starting processing of the detection unit 402 and the update unit 403. For example, the acquisition unit 401 may accept that a command has been acquired, as a trigger for starting processing of the conversion unit 404. For example, the acquisition unit 401 may accept that a response has been acquired, as a trigger for starting processing of the conversion unit 404.

The detection unit 402 detects that a recording medium has been removed from the slot or that a recording medium has been mounted in the slot. The detection unit 402 compares, for example, a result of a current inquiry with a result of a previous inquiry. Then, for example, on the basis of the comparison result, the detection unit 402 detects that a recording medium has been removed from the slot or that a recording medium has been mounted in the slot.

Specifically, a case may be considered in which the acquisition unit 401 has not acquired actual identification information unique to a recording medium mounted in the slot as a result of the previous inquiry, but has acquired actual identification information unique to a recording medium mounted in the slot as a result of the current inquiry. In this case, specifically, the detection unit 402 detects that a recording medium has been newly mounted in the slot on the basis of the comparison result. This allows the detection unit 402 to enable grasping of a mounting status of the recording medium on the slot, and enable determination as to how to update storage contents of the storage unit 400.

Specifically, a case may be considered in which the acquisition unit 401 has acquired actual identification information unique to a recording medium mounted in the slot as a result of the previous inquiry, but has not acquired actual identification information unique to a recording medium mounted in the slot as a result of the current inquiry. In this case, specifically, the detection unit 402 detects that a recording medium has been removed from the slot on the basis of the comparison result. This allows the detection unit 402 to enable grasping of a mounting status of the recording medium on the slot, and enable determination as to how to update storage contents of the storage unit 400.

Specifically, a case may be considered in which the acquisition unit 401 has acquired actual identification information unique to a recording medium mounted in the slot as a result of the previous inquiry, and has acquired actual identification information unique to a recording medium mounted in the slot as a result of the current inquiry, but the two pieces of the actual identification information do not match. In this case, specifically, the detection unit 402 detects that a recording medium has been removed from the slot and that another recording medium has been mounted in the slot, on the basis of the comparison result. In other words, for example, the detection unit 402 detects that the recording medium in the slot has been replaced. This allows the detection unit 402 to enable grasping of a mounting status of the recording medium on the slot, and enable determination as to how to update storage contents of the storage unit 400.

The update unit 403 updates storage contents of the storage unit 400. The update unit 403 updates actual identification information that is stored in the storage unit 400 in association with virtual identification information and is unique to a recording medium mounted in the slot. The update unit 403 may further update identification information that is stored in the storage unit 400 and is of a control device that controls access to a recording medium mounted in the slot.

For example, a case may be considered in which the detection unit 402 detects that a recording medium has been removed from the slot and another recording medium has been mounted. In this case, the update unit 403 updates, for example, actual identification information that is stored in the storage unit 400 in association with virtual identification information and is unique to the removed recording medium, to actual identification information unique to the mounted recording medium.

In this case, the update unit 403 may further update, for example, identification information that is stored in the storage unit 400 in association with virtual identification information and is of a control device that controls access to a removed recording medium, to identification information of a control device that controls access to a mounted recording medium. This allows the update unit 403 to correctly reflect a current mounting status of the recording medium on the slot, in the storage contents of the storage unit 400.

Specifically, a case may be considered in which the detection unit 402 detects that a recording medium has been mounted in the slot. In this case, specifically, the update unit 403 associates and stores actual identification information that is unique to the recording medium and is obtained as a result of an inquiry, with the virtual identification information in the storage unit 400. In this case, the update unit 403 may further store identification information of a control device that controls access to a recording medium, in the storage unit 400 in association with the virtual identification information. This allows the update unit 403 to correctly reflect a current mounting status of the recording medium on the slot, in the storage contents of the storage unit 400.

Specifically, a case may be considered in which the detection unit 402 detects that a recording medium has been removed from the slot. In this case, specifically, the update unit 403 deletes, from the storage unit 400, actual identification information that is unique to the recording medium and stored in the storage unit 400 in association with virtual identification information. In this case, from the storage unit 400, the update unit 403 may further delete identification information that is stored in the storage unit 400 in association with the virtual identification information and is of a control device that controls access to a recording medium. This allows the update unit 403 to correctly reflect a current mounting status of the recording medium on the slot, in the storage contents of the storage unit 400.

When the conversion unit 404 receives a command containing virtual identification information from the host device 102, the conversion unit 404 converts the virtual identification information contained in the received command into actual identification information on the basis of the storage unit 400. The conversion unit 404 converts, for example, the virtual identification information contained in the received command into actual identification information stored in the storage unit 400, in association with the virtual identification information.

Specifically, the conversion unit 404 receives a command containing a virtual SUBNQN from the host device 102. Then, specifically, the conversion unit 404 converts the virtual SUBNQN contained in the received command into an actual SUBNQN unique to the SSD 160 including the NVM 163. This allows the conversion unit 404 to enable a command to be transmitted and the recording medium to be used, even if the host device 102 does not recognize actual identification information unique to the recording medium.

When the conversion unit 404 receives a response containing actual identification information from a control device that controls access to a recording medium mounted in the slot, the conversion unit 404 converts the actual identification information contained in the received response into virtual identification information on the basis of the storage unit 400. For example, the conversion unit 404 converts the actual identification information contained in the received response into virtual identification information stored in the storage unit 400, in association with the actual identification information.

Specifically, the conversion unit 404 receives a response containing an actual SUBNQN unique to the SSD 160 including the NVM 163 from the SSD-CNT 161 of the SSD 160 including the NVM 163. Then, specifically, the conversion unit 404 converts the actual SUBNQN that is unique to the SSD 160 including the NVM 163 and is contained in the received response, into a virtual SUBNQN. This allows the conversion unit 404 to enable a response to be received and the recording medium to be used, even if the host device 102 does not recognize actual identification information unique to the recording medium.

The output unit 405 outputs a processing result of at least any of the function units. An output format is, for example, display on a display, print output to a printer, transmission to an external device by the network I/F 303, or storage to the storage area of the memory 123, or the like. This allows the output unit 405 to make it possible to notify the user of a processing result of any of the function units, and may improve convenience of the storage control device 101.

The output unit 405 outputs a command. The output unit 405 transmits, for example, a converted command to a control device that controls access to a recording medium mounted in the slot. A transmission destination is a control device that controls access to a recording medium indicated by actual identification information contained in the converted command. Specifically, the output unit 405 transmits the converted command to the SSD-CNT 161 of the SSD 160 including the NVM 163. This allows the output unit 405 to correctly transfer a command from the host device 102 to the control device that controls access to the recording medium.

For example, when the output unit 405 receives, from the host device 102, a command that does not contain virtual identification information, the output unit 405 transmits the received command to a control device that controls access to a recording medium mounted in the slot. Specifically, the output unit 405 transmits a command that does not contain the virtual SUBNQN to the SSD-CNT 161 of the SSD 160 including the NVM 163. This allows the output unit 405 to correctly transfer a command from the host device 102 to the control device that controls access to the recording medium.

The output unit 405 outputs a response to the command. The output unit 405 transmits, for example, a converted response to the host device 102. Specifically, the output unit 405 transmits a response containing an actual SUBNQN of the SSD 160 including the NVM 163 to the host device 102. This allows the output unit 405 to correctly transfer, to the host device 102, a response that is from a control device that controls access to the recording medium and is for the command from the host device 102.

When the output unit 405 receives, for example, a response that does not contain actual identification information from a control device that controls access to a recording medium, the output unit 405 transmits the received response to the host device 102. Specifically, the output unit 405 transmits a response that does not contain actual SUBNQN of the SSD 160 including the NVM 163 to the host device 102. This allows the output unit 405 to correctly transfer, to the host device 102, a response that is from a control device that controls access to the recording medium and is for the command from the host device 102.

The output unit 405 outputs a mounting status of a recording medium on the slot. For example, a case may be considered in which the detection unit 402 detects that a recording medium has been removed from the slot. In this case, the output unit 405 outputs, for example, a notification that the recording medium has been removed from the slot. Specifically, the output unit 405 transmits a notification that the recording medium has been removed from the slot, to the host device 102. The host device 102 as the transmission destination is, for example, the host device 102 designated as a notification destination by flag information stored in an NA table 500 described later in FIG. 5. This allows the output unit 405 to enable the host device 102 to recognize the mounting status of the recording medium on the slot.

For example, a case may be considered in which the detection unit 402 detects that a recording medium has been mounted in the slot. In this case, the output unit 405 outputs, for example, a notification that the recording medium has been mounted in the slot. Specifically, the output unit 405 transmits the notification that the recording medium has been mounted in the slot, to the host device 102. The host device 102 as the transmission destination is, for example, the host device 102 designated as a notification destination by flag information stored in the NA table 500 described later in FIG. 5. This allows the output unit 405 to enable the host device 102 to recognize the mounting status of the recording medium on the slot.

(Example of Storage Control System 100)

Next, an example of the storage control system 100 will be described. In the example, the ST-CPU 121 has a function of performing various operations represented in the following (a) to (g).

(a) The ST-CPU 121 determines whether or not SQE received from the host device 102 contains a virtual SUBNQN and a virtual CNTLID. The CNTLID is vendor-specific identification information of the SSD-CNT 161. When the ST-CPU 121 determines that the SQE received from the host device 102 contains the virtual SUBNQN and the virtual CNTLID, the ST-CPU 121 transfers the SQE to the ST-DCNT 122. When the ST-CPU 121 determines that the SQE received from the host device 102 does not contain the virtual SUBNQN and the virtual CNTLID, the ST-CPU 121 transfers the SQE to a designated SSD 160.

(b) The ST-CPU 121 transfers, to the designated SSD 160, the SQE in which the virtual SUBNQN and the virtual CNTLID are converted into actual SUBNQN and actual CNTLID by the ST-DCNT 122 as a result of transferring the SQE to the ST-DCNT 122.

(c) The ST-CPU 121 determines whether or not the CQE received from the SSD 160 contains the actual SUBNQN and the actual CNTLID. When the ST-CPU 121 determines that the CQE received from the SSD 160 contains the actual SUBNQN and the actual CNTLID, the ST-CPU 121 transfers the CQE to the ST-DCNT 122. When the ST-CPU 121 determines that the CQE received from the SSD 160 does not contain actual SUBNQN and the actual CNTLID, the ST-CPU 121 transfers the CQE to the designated host device 102.

(d) The ST-CPU 121 transfers, to the designated host device 102, the CQE in which the actual SUBNQN and the actual CNTLID are converted into the virtual SUBNQN and the virtual CNTLID by the ST-DCNT 122 as a result of transferring the CQE to the ST-DCNT 122.

(e) The ST-CPU 121 receives discovery information and identification information from the ST-DCNT 122 at every predetermined timing. The discovery information contains actual SUBNQN, actual CNTLID, and the like that are unique to the SSD 160. The ST-CPU 121 compares discovery information and identification information of a previous generation received from the ST-DCNT 122 in the past, with newly received discovery information and identification information of this generation. On the basis of the comparison result, the ST-CPU 121 detects that the SSD 160 has been replaced, the SSD 160 has been added, or the SSD 160 has been reduced. The replacement corresponds that the SSD 160 is removed from the slot 150 and then a different SSD 160 is newly mounted in the same slot 150. The addition corresponds to that the SSD 160 is newly mounted in the slot 150. The reduction corresponds to that the SSD 160 is removed from the slot 150.

(f) When the ST-CPU 121 detects in (e) that the SSD 160 has been added, the ST-CPU 121 transmits an interrupt indicating that the SSD 160 has been added, to the host device 102 that has been set as a notification destination by the administrator of the storage control device 101 in advance. The set notification destination is stored, for example, by the notification acceptance (NA) table described later in FIG. 5.

(g) When the ST-CPU 121 detects in (e) that the SSD 160 has been reduced, the ST-CPU 121 transmits an interrupt indicating that the SSD 160 has been reduced, to the host device 102 that has been set as a notification destination by the administrator of the storage control device 101 in advance. The set notification destination is stored, for example, by the NA table described later in FIG. 5. At this time, the ST-CPU 121 transmits an interrupt indicating that the SSD 160 has been reduced, for example, to the host device 102 that has been set as a notification destination and has established communication with the reduced SSD 160.

In the example, the ST-DCNT 122 has a function of performing various operations represented in the following (h) to (p).

(h) The ST-DCNT 122 collects discovery information and identification information defined in the NVMe/NVMeoF specifications, from each SSD 160 at every predetermined timing. The ST-DCNT 122 transmits the collected discovery information and identification information to the ST-CPU 121.

(i) The ST-DCNT 122 aggregates the discovery information and identification information collected in (h) from each SSD 160, and manages aggregated various types of information. The ST-DCNT 122 stores and manages, for example, the aggregated information of the discovery information and the identification information collected in (h), in the DLC table 600 described later in FIG. 6.

(j) When the managed various types of information is updated, the ST-DCNT 122 transmits an interrupt indicating the information update to the ST-CPU 121.

(k) The ST-DCNT 122 does not provide, to the host device 102, as they are, an actual SUBNQN and an actual CNTLID contained in the discovery information collected in (h) from each SSD 160. The ST-DCNT 122 converts, for example, the actual SUBNQN and the actual CNTLID into a virtual SUBNQN and a virtual CNTLID. The ST-DCNT 122 provides, for example, a discovery log containing the converted virtual SUBNQN and virtual CNTLID, to the host device 102 via the ST-CPU 121.

(l) The ST-DCNT 122 receives SQE including the virtual SUBNQN and the virtual CNTLID for the SSD 160, from the host device 102 via the ST-CPU 121. The ST-DCNT 122 converts the virtual SUBNQN and the virtual CNTLID contained in the received SQE into an actual SUBNQN and an actual CNTLID. The ST-DCNT 122 transmits the converted SQE including the converted actual SUBNQN and actual CNTLID, to the SSD 160 via the ST-CPU 121.

(m) The ST-DCNT 122 receives CQE for the SQE transmitted in (l) from the SSD 160 via the ST-CPU 121. The ST-DCNT 122 converts an actual SUBNQN and an actual CNTLID contained in the received CQE into a virtual SUBNQN and a virtual CNTLID. The ST-DCNT 122 transmits the converted CQE including the converted virtual SUBNQN and virtual CNTLID, to the host device 102 via the ST-CPU 121.

(n) The ST-DCNT 122 scans each slot 150 as to whether or not the SSD 160 is mounted.

(o) The ST-DCNT 122 stores a network address pool in which network addresses for setting in each SSD 160 are secured. The network address pool includes a network address to be set in the SSD 160 mounted in each slot 150, in association with each slot 150.

(p) The ST-DCNT 122 sets a network address that is extracted from the network address pool and corresponds to the slot 150 mounted with the SSD 160, to the SSD 160 detected as a result of scanning in (n).

This allows the storage control device 101 to enable the host device 102 to avoid recognizing replacement of the SSD 160 before and after replacement of the SSD 160, and to continue to use the virtual SUBNQN and the virtual CNTLID. Therefore, the storage control device 101 may reduce a work error and a work load on the operator and the administrator when the SSD 160 is replaced.

The administrator can replace the SSD 160 without having specialized knowledge about NVMe, which may reduce the work load. Since the operator does not have to perform work associated with replacement of the SSD 160, the work load may be reduced. Since the operator does not have to perform work associated with replacement of the SSD 160, it is possible to inhibit an occurrence of a work error.

(Specific Operation Example of Storage Control System 100)

Next, with reference to FIGS. 5 to 32, a specific operation example of the storage control system 100 will be described.

In the operation example, the memory 123 stores the notification acceptance (NA) table 500 described later in FIG. 5 and the DLC table 600 described later in FIG. 6. The host device 102 stores an NVMe drive (ND) table 700, which will be described later in FIG. 7.

(Storage Contents of NA Table 500)

Next, with reference to FIG. 5, one example of storage contents of the NA table 500 stored in the storage control device 101 illustrated in FIG. 1 will be described. The NA table 500 is realized by, for example, a storage area of the memory 123 and the like of the storage control device 101 illustrated in FIG. 1.

FIG. 5 is an explanatory view illustrating one example of storage contents in the NA table 500. As illustrated in FIG. 5, the NA table 500 has fields for HOSTNQN and NA. In the NA table 500, NA information is stored as a record 500-a, by setting information in each field for every host device 102. a is any integer.

In the HOSTNQN field, a HOSTNQN is set as identification information for identifying the host device 102. In the NA field, flag information is set indicating whether or not to transmit a notification of a mounting status of the SSD 160 on the slot 150, to the host device 102 identified by the HOSTNQN. When the flag information is YES, transmitting is indicated. When the flag information is NO, not transmitting is indicated.

(Storage Contents of DLC Table 600)

Next, with reference to FIG. 6, one example of storage contents of the DLC table 600 stored in the storage control device 101 illustrated in FIG. 1 will be described. The DLC table 600 is realized by, for example, a storage area of the memory 123 and the like of the storage control device 101 illustrated in FIG. 1.

FIG. 6 is an explanatory view illustrating one example of storage contents in the DLC table 600. As illustrated in FIG. 6, the DLC table 600 has fields for Slot, SSD Installation, Network Address, Physical SUBNQN, SUBNQN, Physical CNTLID, CNTLID, Associated HOSTNQN, and Other. In the DLC table 600, DLC information is stored as a record 600-b, by setting information in each field for every slot 150. b is any integer.

In the Slot field, identification information for identifying the slot 150 is set. In the SSD Installation field, information indicating a mounting status of the SSD 160 on the slot 150 is set. In the SSD Installation field, Present is set when the SSD 160 is mounted in the slot 150. In the SSD Installation field, None is set when the SSD 160 is not mounted in the slot 150. In the Network Address field, Network Address assigned to each SSD 160 is set.

In the Physical SUBNQN field, an actual SUBNQN uniquely assigned to the SSD 160 mounted in the slot 150 is set. In the SUBNQN field, a virtual SUBNQN for commonly assigning to the SSD 160 mounted in the slot 150 is set. In the Physical CNTLID field, an actual CNTLID uniquely assigned to the SSD 160 mounted in the slot 150 is set. In the CNTLID field, a virtual CNTLID for commonly assigning to the SSD 160 mounted in the slot 150 is set.

In the Associated HOSTNQN field, HOSTNQN is set as identification information for identifying the host device 102 that has established communication with the SSD 160 mounted in the slot 150. In the Other field, various types of information about slot 150 is set. The various types of information is, for example, a Port ID or the like.

(Storage Contents of ND Table 700)

Next, with reference to FIG. 7, one example of storage contents of the ND table 700 stored in the host device 102 illustrated in FIG. 1 will be described. The ND table 700 is realized by, for example, a storage area of the memory 302, the recording medium 305, or the like of the host device 102 illustrated in FIG. 3.

FIG. 7 is an explanatory view illustrating one example of storage contents in the ND table 700. As illustrated in FIG. 7, the ND table 700 has fields for Logical Drive, Network Address, SUBNQN, and Other. In the ND table 700, Logical Drive information is stored as a record 700-c, by setting information in each field for every Logical Drive. c is any integer.

In the Logical Drive field, identification information for identifying the Logical Drive is set. In the Network Address field, the Network Address for identifying the SSD 160 assigned with the Logical Drive is set. In the SUBNQN field, the virtual SUBNQN assigned to the SSD 160 assigned with the Logical Drive is set. In the Other field, various types of information related to the SSD 160 assigned with the Logical Drive is set. The various types of information is, for example, Namespace ID or the like.

(One Example of Recognizing SSD 160)

Next, with reference to FIGS. 8 to 14, a description is given to one example in which the storage control device 101 recognizes the SSD 160 mounted in the slot 150 in an operation example.

FIGS. 8 to 14 are explanatory views illustrating one example of recognizing the SSD 160. In FIG. 8, since a state immediately after connection of the storage control device 101 to the host device 102 is an initial state, various types of information is not set in the NVMe drive (ND) table 700. Not set indicates being unset. In the initial state of the storage control device 101, a virtual SUBNQN and a virtual CNTLID are set in the DLC table 600. The virtual SUBNQN and the virtual CNTLID are, for example, set in advance at a time of shipment of the storage control device 101. Next, a description of FIG. 9 will be made.

In FIG. 9, the storage control device 101 assigns a network address extracted from the network address pool to each slot 150, on the basis of an operation input by the administrator. The storage control device 101 sets a network address assigned to each slot 150, in the DLC table 600. Next, a description of FIG. 10 will be made.

In FIG. 10, the storage control device 101 starts scanning as to whether or not the SSD 160 has been mounted in each slot 150. When there is the SSD 160 mounted in each slot 150, the storage control device 101 sets a network address corresponding to each slot 150. When there is the SSD 160 mounted in each slot 150, the storage control device 101 sets a mounting status of the SSD 160 in each slot 150, in the DLC table 600. Next, a description of FIG. 11 will be made.

In FIG. 11, the storage control device 101 collects discovery information and identification information from each SSD 160 mounted in the slot 150. The storage control device 101 sets the collected discovery information and identification information in the DLC table 600. The storage control device 101 sets, for example, an actual SUBNQN and an actual CNTLID in the DLC table 600. This allows the storage control device 101 to associate the virtual SUBNQN and the virtual CNTLID with the actual SUBNQN and the actual CNTLID. Next, a description of FIG. 12 will be made.

Figure 12:
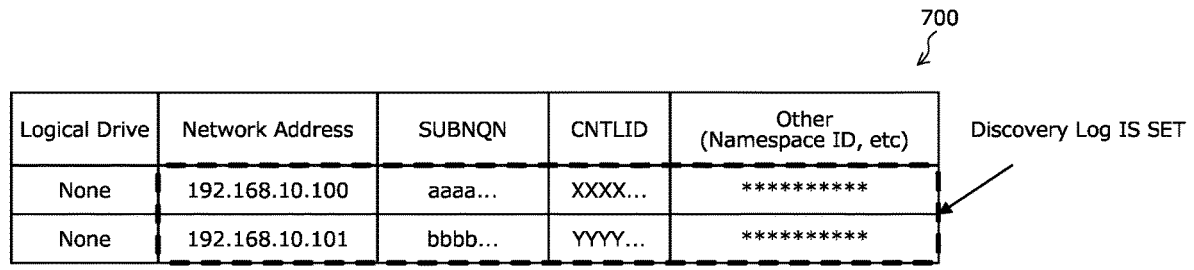
FIG. 12 is an explanatory view (No. 5) illustrating one example of recognizing the SSD 160.

In FIG. 12, the storage control device 101 receives a discovery command from the host device 102. In response to the discovery command, the storage control device 101 transmits a discovery log containing a network address and a virtual SUBNQN and a virtual CNTLID to the host device 102. The host device 102 sets the discovery log in the ND table 700. The host device 102 sets, for example, the network address and the virtual SUBNQN and the virtual CNTLID, in the ND table 700. This allows the host device 102 to store information to be used when accessing the SSD 160. Next, a description of FIG. 13 will be made.

In FIG. 13, the host device 102 establishes an association with the SSD 160 as defined in the NVMeoF specification. When the host device 102 establishes the association with the SSD 160, the storage control device 101 sets, in the DLC table 600, the HOSTNQN for identifying the host device 102 that is about to establish the association with the SSD 160. Next, a description of FIG. 14 will be made.

In FIG. 14, the host device 102 assigns the SSD 160 with which the association has been established, to the Logical Drive. The host device 102 sets a result of assigning the SSD 160 to the Logical Drive, in the ND table 700.

In this way, the storage control device 101 can complete preparation for relaying exchange of data between the host device 102 and the SSD 160. Furthermore, the host device 102 can complete preparation for accessing the SSD 160.

(Recognition Processing Procedure)

Next, with reference to FIGS. 15 to 18, one example of a recognition processing procedure executed by the storage control system 100 will be described. The recognition processing realizes various operations of the storage control device 101 and the host device 102 illustrated in FIGS. 8 to 14.

Figure 15:
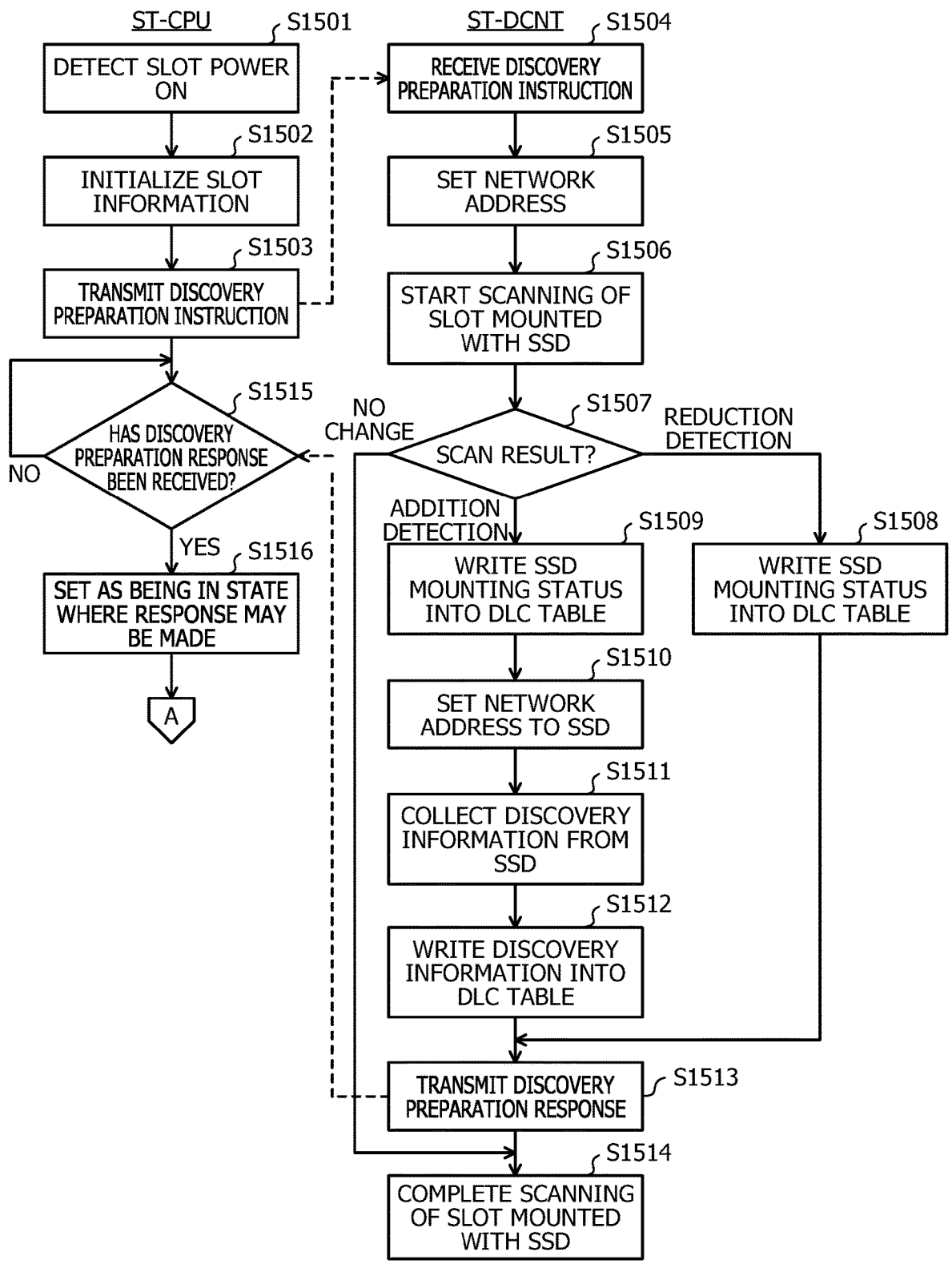
FIG. 15 is a sequence diagram (No. 1) illustrating one example of a recognition processing procedure.

FIGS. 15 to 18 are sequence diagrams illustrating one example of the recognition processing procedure. In FIG. 15, the ST-CPU 121 detects slot power ON (step S1501). Next, the ST-CPU 121 initializes slot information (step S1502). Then, the ST-CPU 121 transmits a discovery preparation instruction to the ST-DCNT 122 (step S1503). Thereafter, the ST-CPU 121 shifts to the processing of step S1515.

Whereas, the ST-DCNT 122 receives the discovery preparation instruction (step S1504). Next, the ST-DCNT 122 sets a network address in the network address pool only for the first time, on the basis of an operation input by the administrator (step S1505). Then, the ST-DCNT 122 starts scanning the slot 150 mounted with the SSD 160 (step S1506).

Next, the ST-DCNT 122 determines whether the scan result is no change, addition detection, or reduction detection (step S1507). Here, when the scan result is no change (step S1507: no change), the ST-DCNT 122 shifts to the processing of step S1514. Furthermore, when the scan result is addition detection (step S1507: addition detection), the ST-DCNT 122 shifts to the processing of step S1509. Furthermore, when the scan result is reduction detection (step S1507: reduction detection), the ST-DCNT 122 shifts to the processing of step S1508.

In step S1508, the ST-DCNT 122 writes a mounting status of the SSD 160 into the DLC table 600 (step S1508). Then, the ST-DCNT 122 shifts to the processing of step S1513.

In step S1509, the ST-DCNT 122 writes a mounting status of the SSD 160 into the DLC table 600 (step S1509). Next, the ST-DCNT 122 sets a network address to the detected SSD 160 (step S1510). Then, the ST-DCNT 122 collects discovery information from the detected SSD 160 (step S1511).

Next, the ST-DCNT 122 writes the collected discovery information into the DLC table 600 (step S1512). Then, the ST-DCNT 122 transmits a discovery preparation response containing the DLC table 600 to the ST-CPU 121 (step S1513). Thereafter, the ST-DCNT 122 completes scanning of the slot 150 mounted with the SSD 160 (step S1514).

In step S1515, the ST-CPU 121 determines whether or not the discovery preparation response has been received (step S1515). Here, when the discovery preparation response has not been received (step S1515: No), the ST-CPU 121 returns to the processing in step S1515. Whereas, when the discovery preparation response has been received (step S1515: Yes), the ST-CPU 121 shifts to the processing of step S1516.

In step S1516, the ST-CPU 121 sets as being in a state where a response may be made for a discovery command from the host device 102 (step S1516). Then, the ST-CPU 121 shifts to the processing of step S1602 in FIG. 16. Next, a description of FIG. 16 will be made.

Figure 16:
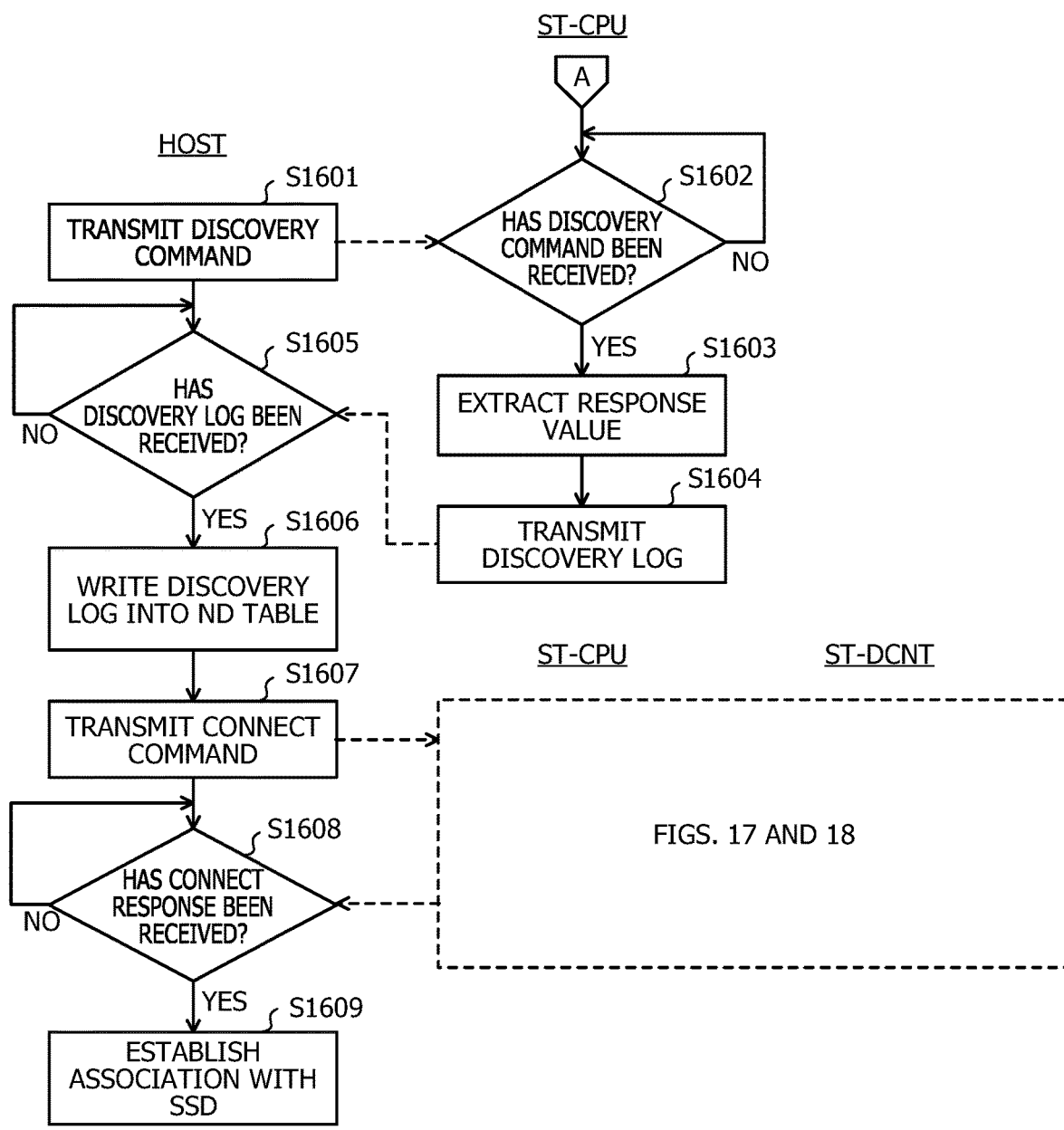
FIG. 16 is a sequence diagram (No. 2) illustrating one example of the recognition processing procedure.

In FIG. 16, the host device 102 transmits the discovery command to the ST-CPU 121 (step S1601). Then, the host device 102 shifts to the processing of step S1605.

Whereas, the ST-CPU 121 determines whether or not the discovery command has been received (step S1602). Here, when the discovery command has not been received (step S1602: No), the ST-CPU 121 returns to the processing in step S1602. Whereas, when the discovery command has been received (step S1602: Yes), the ST-CPU 121 shifts to the processing of step S1603.

In step S1603, the ST-CPU 121 extracts a virtual SUB-NQN, a virtual CNTLID, and the like as a response value from the DLC table 600 (step S1603). Next, the ST-CPU 121 transmits a discovery log containing the response value to the host device 102 (step S1604).

Whereas, the host device 102 determines whether or not the discovery log has been received (step S1605). Here, when the discovery log has not been received (step S1605: No), the host device 102 returns to the processing in step S1605. Whereas, when the discovery log has been received (step S1605: Yes), the host device 102 shifts to the processing of step S1606.

In step S1606, the host device 102 writes the discovery log into the ND table 700 (step S1606). Next, the host device 102 transmits a connect command to the ST-CPU 121 (step S1607). Then, the host device 102 shifts to the processing of step S1608.

Whereas, the ST-CPU 121 receives the connect command. When the ST-CPU 121 receives the connect command, the ST-CPU 121 executes various processes described later in FIGS. 17 and 18 together with the ST-DCNT 122, and transmits a response to the connect command to the host device 102.

Thereafter, the host device 102 determines whether or not the response to the connect command has been received (step S1608). Here, when the response has not been received (step S1608: No), the host device 102 returns to the processing in step S1608. Whereas, when the response has been received (step S1608: Yes), the host device 102 shifts to the processing of step S1609.

In step S1609, the host device 102 establishes an association with the SSD 160 (step S1609). Then, the storage control system 100 ends the recognition processing. This allows the storage control system 100 to complete the preparation for the host device 102 to use the SSD 160.

Figure 17:
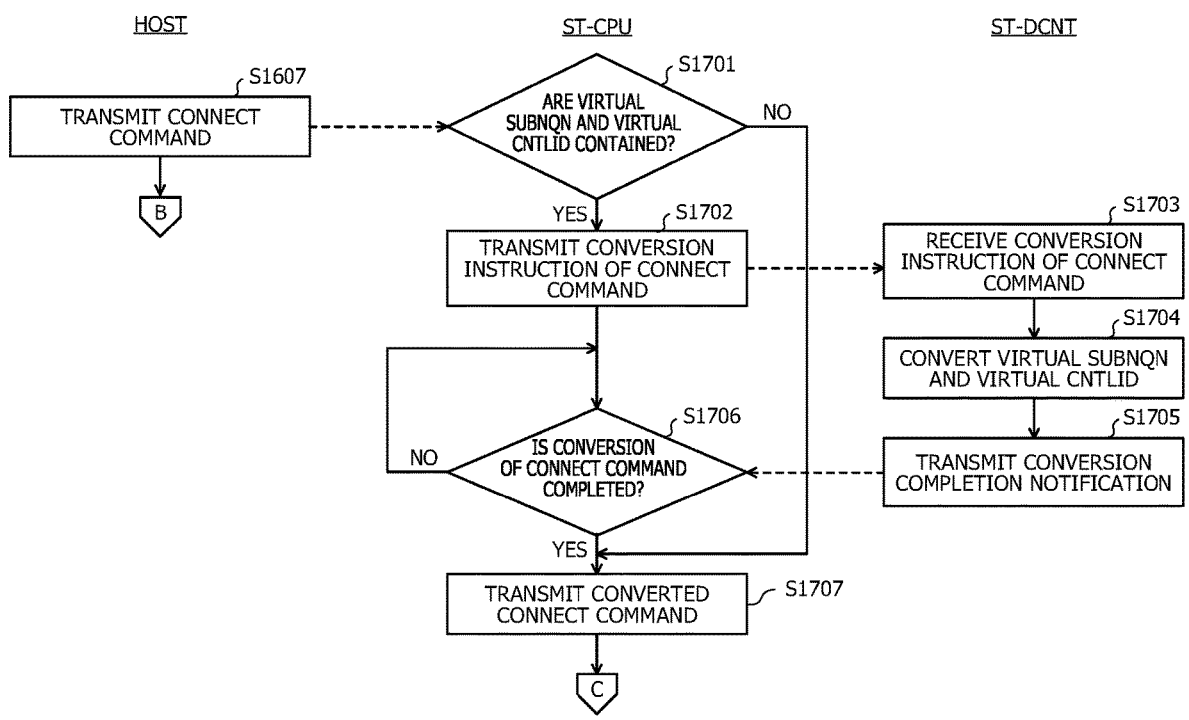
FIG. 17 is a sequence diagram (No. 3) illustrating one example of the recognition processing procedure.

In FIG. 17, when the ST-CPU 121 receives the connect command, the ST-CPU 121 determines whether or not the connect command contains a virtual SUBNQN and a virtual CNTLID (step S1701). Here, when the virtual SUBNQN and the virtual CNTLID are not contained (step S1701: No), the ST-CPU 121 shifts to the processing of step S1707. Whereas, when the virtual SUBNQN and the virtual CNTLID are contained (step S1701: Yes), the ST-CPU 121 shifts to the processing of step S1702.

In step S1702, the ST-CPU 121 transmits a conversion instruction of the connect command, including the connect command, to the ST-DCNT 122 (step S1702). Then, the ST-CPU 121 shifts to the processing of step S1706.

Whereas, the ST-DCNT 122 receives the conversion instruction of the connect command (step S1703). Next, the ST-DCNT 122 converts the virtual SUBNQN and the virtual CNTLID contained in the connect command to an actual SUBNQN and an actual CNTLID on the basis of the DCL table (step S1704). Then, the ST-DCNT 122 transmits a conversion completion notification of the connect command, including the converted connect command, to the ST-CPU 121 (step S1705).

Whereas, the ST-CPU 121 determines whether or not the conversion of the connect command is completed (step S1706). Here, when the conversion of the connect command is not completed (step S1706: No), the ST-CPU 121 returns to the processing of step S1706. Whereas, when the conversion of the connect command is completed (step S1706: Yes), the ST-CPU 121 shifts to the processing of step S1707.

In step S1707, the ST-CPU 121 transmits the converted connect command to the SSD-CNT 161 (step S1707). Then, the ST-CPU 121 shifts to the processing of step S1801 in FIG. 18.

Whereas, when the SSD-CNT 161 receives the converted connect command, the SSD-CNT 161 executes the received converted connect command, and returns a response to the connect command, to the ST-CPU 121.

Figure 18:
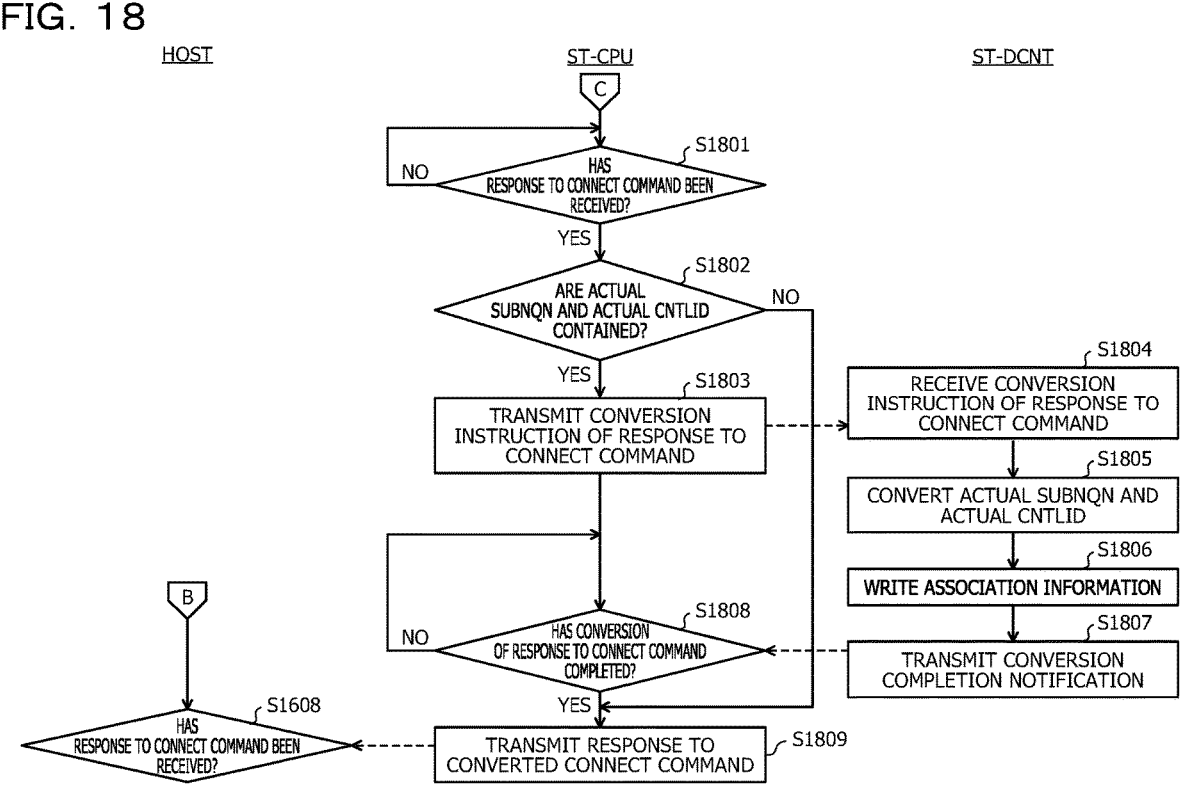
FIG. 18 is a sequence diagram (No. 4) illustrating one example of the recognition processing procedure.

In FIG. 18, the ST-CPU 121 determines whether or not the response to the connect command has been received (step S1801). Here, when the response has not been received (step S1801: No), the ST-CPU 121 returns to the processing in step S1801. Whereas, when the response has been received (step S1801: Yes), the ST-CPU 121 shifts to the processing of step S1802.

In step S1802, the ST-CPU 121 determines whether the response to the connect command contains actual SUBNQN and actual CNTLID (step S1802). Here, when the actual SUBNQN and the actual CNTLID are not contained (step S1802: No), the ST-CPU 121 shifts to the processing of step S1809. Whereas, when the actual SUBNQN and the actual CNTLID are contained (step S1802: Yes), the ST-CPU 121 shifts to the processing of step S1803.

In step S1803, the ST-CPU 121 transmits, to the ST-DCNT 122, a conversion instruction of the response to the connect command, including the response to the connect command (step S1803). Then, the ST-CPU 121 shifts to the processing of step S1808.

Whereas, the ST-DCNT 122 receives the conversion instruction of the response to the connect command (step S1804). Next, the ST-DCNT 122 converts the actual SUBNQN and the actual CNTLID contained in the response to the connect command into a virtual SUBNQN and a virtual CNTLID on the basis of the DCL table (step S1805). Next, the ST-DCNT 122 writes association information into the DCL table (step S1806). Then, the ST-DCNT 122 transmits, to the ST-CPU 121, a conversion completion notification of the response to the connect command, including the response to the converted connect command (step S1807).

Whereas, the ST-CPU 121 determines whether or not the conversion of the response to the connect command is completed (step S1808). Here, when the conversion of the response to the connect command is not completed (step S1808: No), the ST-CPU 121 returns to the processing of step S1808. Whereas, when the conversion of the response to the connect command is completed (step S1808: Yes), the ST-CPU 121 shifts to the processing of step S1809.

In step S1809, the ST-CPU 121 returns a response to the converted connect command to the host device 102 (step S1809).

This allows the storage control system 100 to enable the host device 102 to use the SSD 160 even when the host device 102 does not recognize actual SUBNQN and the actual CNTLID. Therefore, the storage control system 100 may reduce the work load on the operator and the administrator.

(One Example of Executing Command)

Figure 19:
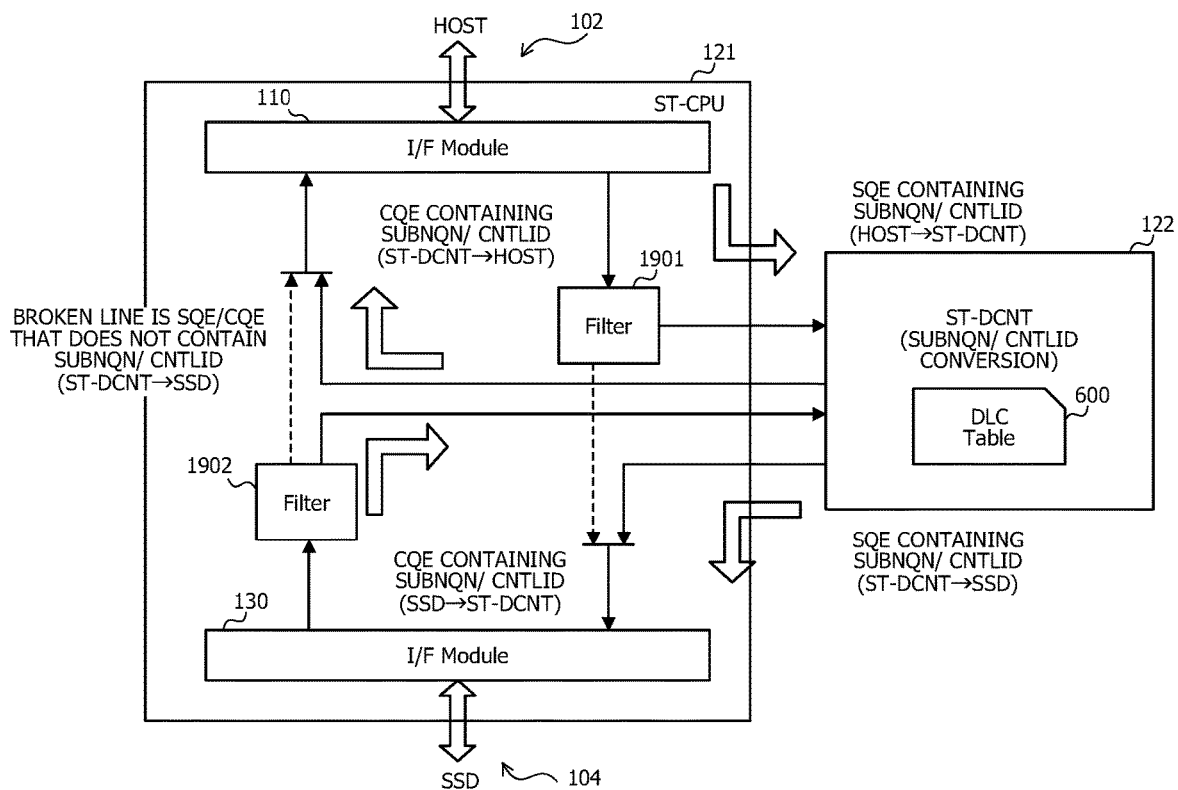
FIG. 19 is an explanatory diagram illustrating one example of executing a command.

Next, with reference to FIG. 19, a description is given to one example in which the storage control device 101 causes the SSD 160 to execute a command in an operation example. The command is, for example, a command related to read or write.

FIG. 19 is an explanatory diagram illustrating one example of executing a command. In FIG. 19, the ST-CPU 121 receives SQE from the host device 102 via the I/F module 110. The ST-CPU 121 determines whether or not the received SQE contains a virtual SUBNQN and a virtual CNTLID by a filter 1901. When the received SQE contains the virtual SUBNQN and the virtual CNTLID, the ST-CPU 121 transmits the received SQE to the ST-DCNT 122. When the received SQE does not contain the virtual SUBNQN and the virtual CNTLID, the ST-CPU 121 transmits the received SQE to the SSD 160, via the I/F module 130.

The ST-DCNT 122 receives the SQE containing the virtual SUBNQN and the virtual CNTLID. The ST-DCNT 122 converts the virtual SUBNQN and the virtual CNTLID contained in the received SQE into an actual SUBNQN and an actual CNTLID, on the basis of the DLC table 600. The ST-DCNT 122 transmits the converted SQE to the ST-CPU 121. The ST-CPU 121 transmits the converted SQE to the SSD 160 via the I/F module 130.

The ST-CPU 121 receives CQE from the SSD 160 via the I/F module 130. The ST-CPU 121 determines whether or not the received CQE contains an actual SUBNQN and an actual CNTLID by a filter 1902. When the received CQE contains the actual SUBNQN and the actual CNTLID, the ST-CPU 121 transmits the received CQE to the ST-DCNT 122. When the received CQE does not contain actual SUBNQN and the actual CNTLID, the ST-CPU 121 transmits the received CQE to the host device 102, via the I/F module 110.

The ST-DCNT 122 receives the CQE containing the actual SUBNQN and the actual CNTLID. The ST-DCNT 122 converts the actual SUBNQN and actual CNTLID contained in the received CQE into a virtual SUBNQN and a virtual CNTLID, on the basis of the DLC table 600. The ST-DCNT 122 transmits the converted CQE to the ST-CPU 121. The ST-CPU 121 returns the converted CQE to the host device 102 via the I/F module 110.

In this way, the storage control device 101 may enable the host device 102 to use the SSD 160 even when the host device 102 does not recognize actual SUBNQN and the actual CNTLID. Therefore, the storage control device 101 may reduce a work error and a work load on the operator and the administrator.

(One Example of Updating DLC Table 600 in Response to Addition of SSD 160)

Figure 20:
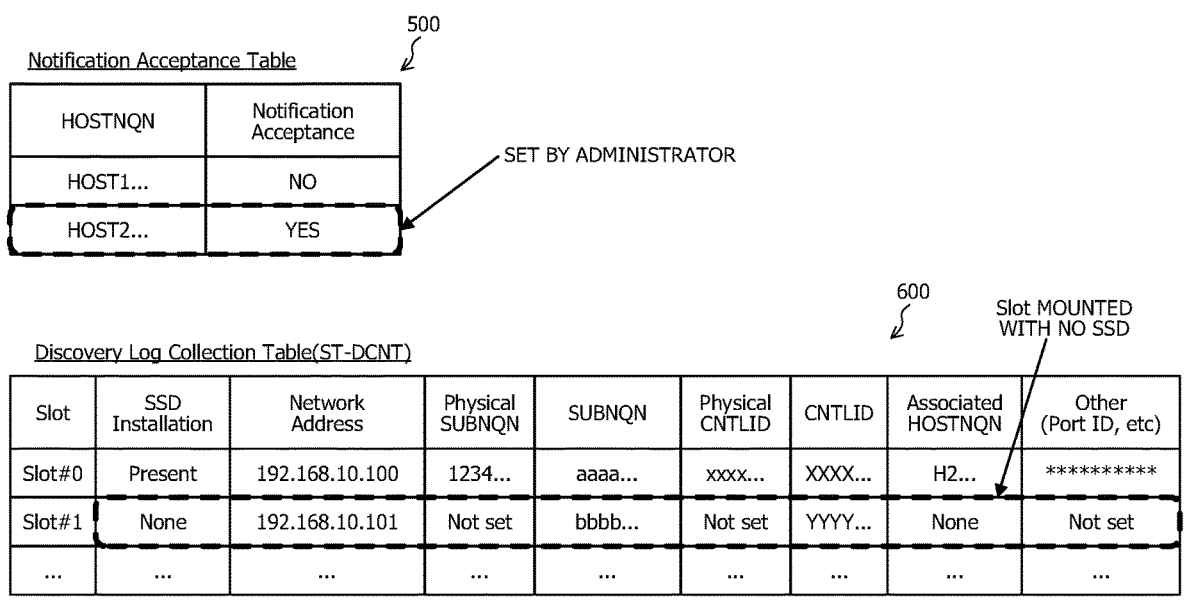
FIG. 20 is an explanatory view (No. 1) illustrating one example of updating the DLC table 600 in response to addition of the SSD 160.

Next, with reference to FIGS. 20 to 22, a description is given to one example in which the storage control device 101 updates the DLC table 600 in response to addition of the SSD 160 in an operation example.

FIGS. 20 to 22 are explanatory views illustrating one example of updating the DLC table 600 in response to addition of the SSD 160. In FIG. 20, it is assumed that the storage control device 101 has already set in the NA table 500 that the host device 102 with HOSTNQN=HOST2 . . . is a notification destination, on the basis of an operation input by the administrator.

Furthermore, it is assumed that the SSD 160 is already mounted in the slot 150 of Slot #0, and the SSD 160 is not mounted in the slot 150 of Slot #1. It is assumed that the storage control device 101 has already set various types of information indicating a mounting status of the SSD 160, in the DLC table 600. Next, a description of FIG. 21 will be made.

In FIG. 21, the storage control device 101 starts scanning as to whether or not the SSD 160 has been mounted in each slot 150. As a result of scanning, the storage control device 101 detects that the SSD 160 has been added to the slot 150 of Slot #1. The storage control device 101 sets a network address corresponding to the slot 150, in the SSD 160 added to the slot 150. The storage control device 101 sets the mounting status of the slot 150, in the DLC table 600. Next, a description of FIG. 22 will be made.

In FIG. 22, the storage control device 101 collects discovery information and identification information from the SSD 160 added to the slot 150. The storage control device 101 sets the collected discovery information and identification information in the DLC table 600. The storage control device 101 sets, for example, an actual SUBNQN and an actual CNTLID in the DLC table 600.

The storage control device 101 transmits a notification that the SSD 160 has been added, to the host device 102 set as the notification destination. Furthermore, on the basis of the DLC table 600, the storage control device 101 transmits an addition notification interrupt containing a virtual SUBNQN and a virtual CNTLID corresponding to the slot 150 added with the SSD 160, to the host device 102.

In this way, the storage control device 101 may appropriately associate the virtual SUBNQN and the virtual CNTLID with the actual SUBNQN and the actual CNTLID, in response to addition of the SSD 160. Therefore, the storage control device 101 may appropriately enable conversion of the virtual SUBNQN and the virtual CNTLID into and from the actual SUBNQN and the actual CNTLID, in response to addition of the SSD 160.

(Addition Processing Procedure)

Next, with reference to FIG. 23, one example of an addition processing procedure executed by the storage control system 100 will be described. The addition processing realizes various operations of the storage control device 101 and the host device 102 illustrated in FIGS. 20 to 22.

Figure 23:
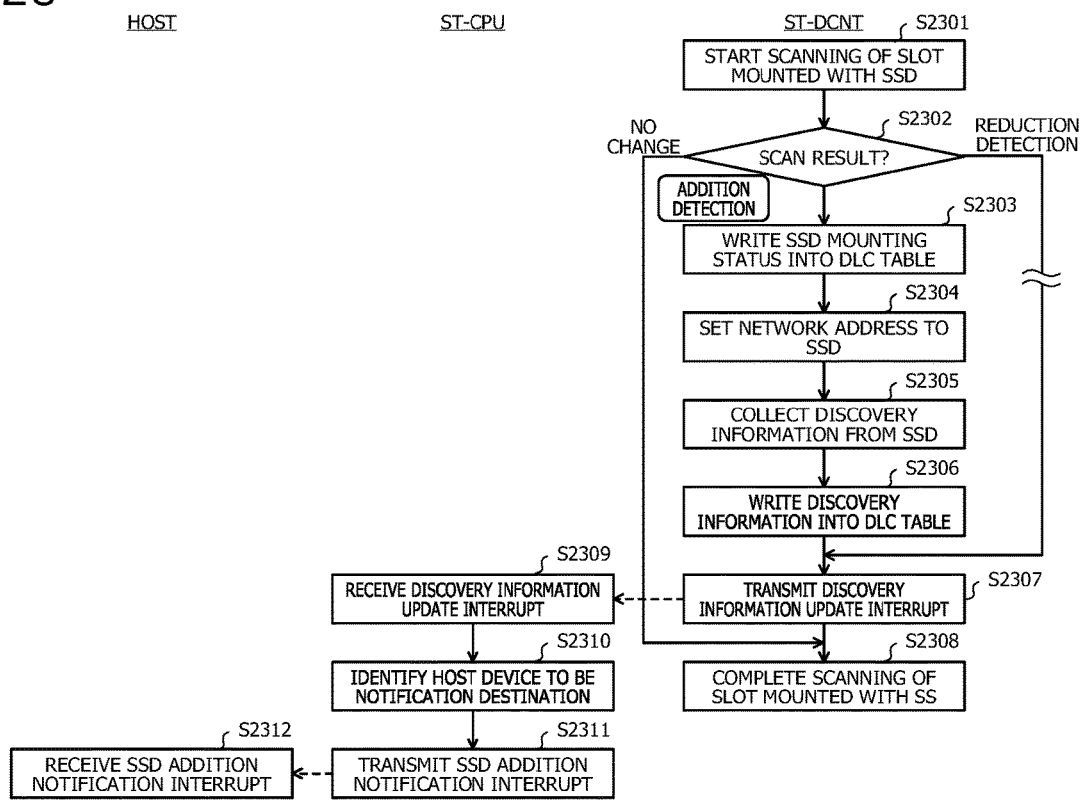
FIG. 23 is a sequence diagram illustrating one example of an addition processing procedure.

FIG. 23 is a sequence diagram illustrating one example of the addition processing procedure. In FIG. 23, the ST-DCNT 122 starts scanning of the slot 150 mounted with the SSD 160 (step S2301). Here, the ST-DCNT 122 determines that the scan result is addition detection (step S2302). Therefore, the ST-DCNT 122 shifts to the processing of step S2303.

In step S2303, the ST-DCNT 122 writes a mounting status of the SSD 160 into the DLC table 600 (step S2303). Then, the ST-DCNT 122 sets a network address to the detected SSD 160 (step S2304).

Next, the ST-DCNT 122 collects discovery information from the detected SSD 160 (step S2305). Then, the ST-DCNT 122 writes the collected discovery information into the DLC table 600 (step S2306).

Next, the ST-DCNT 122 transmits a discovery information update interrupt containing the DLC table 600, to the ST-CPU 121 (step S2307). Then, the ST-DCNT 122 completes scanning of the slot 150 mounted with the SSD 160 (step S2308).

Whereas, the ST-CPU 121 receives the discovery information update interrupt (step S2309). Next, the ST-CPU 121 identifies the host device 102 to be a notification destination, on the basis of the NA table 500 (step S2310). Then, the ST-CPU 121 transmits an addition notification interrupt of the SSD 160 to the host device 102 to be the notification destination (step S2311).

Whereas, the host device 102 receives the addition notification interrupt of the SSD 160 (step S2312). Then, the storage control system 100 ends the addition processing. This allows the storage control system 100 to appropriately associate the virtual SUBNQN and the virtual CNTLID with the actual SUBNQN and the actual CNTLID, in response to addition of the SSD 160.

(One Example of Updating DLC Table 600 in Response to Reduction of SSD 160)

Next, with reference to FIGS. 24 and 25, a description is given to one example in which the storage control device 101 updates the DLC table 600 in response to reduction of the SSD 160 in an operation example.

FIGS. 24 and 25 are explanatory views illustrating one example of updating the DLC table 600 in response to reduction of the SSD 160. In FIG. 24, it is assumed that the storage control device 101 has already set in the NA table 500 that the host device 102 with HOSTNQN=HOST1 . . . is a notification destination, on the basis of an operation input by the administrator.

Furthermore, it is assumed that the SSD 160 is already mounted in the slot 150 of Slot #0, and the SSD 160 is already mounted in the slot 150 of Slot #1. It is assumed that the storage control device 101 has already set various types of information indicating a mounting status of the SSD 160, in the DLC table 600. Next, a description of FIG. 25 will be made.

In FIG. 25, the storage control device 101 starts scanning as to whether or not the SSD 160 has been mounted in the slot 150. As a result of scanning, the storage control device 101 detects that the SSD 160 has been reduced from the slot 150 of Slot #1. The storage control device 101 sets the mounting status of the slot 150, in the DLC table 600. The storage control device 101 sets, to None, for example, SSD Installation corresponding to the slot 150 from which the SSD 160 is reduced.

When the SSD 160 is reduced, the storage control device 101 transmits a notification that the SSD 160 has been reduced, to the host device 102 set as the notification destination. When the SSD 160 is reduced, the storage control device 101 does not have to provide the host device 102 with a virtual SUBNQN and a virtual CNTLID corresponding to the slot 150 from which the SSD 160 is reduced. In this way, the storage control device 101 may appropriately enable identification of the slot 150 from which the SSD 160 is reduced, in response to reduction in the SSD 160.

(Reduction Processing Procedure)

Next, with reference to FIG. 26, one example of a reduction processing procedure executed by the storage control system 100 will be described. The reduction processing realizes various operations of the storage control device 101 and the host device 102 illustrated in FIGS. 24 and 25.

Figure 26:
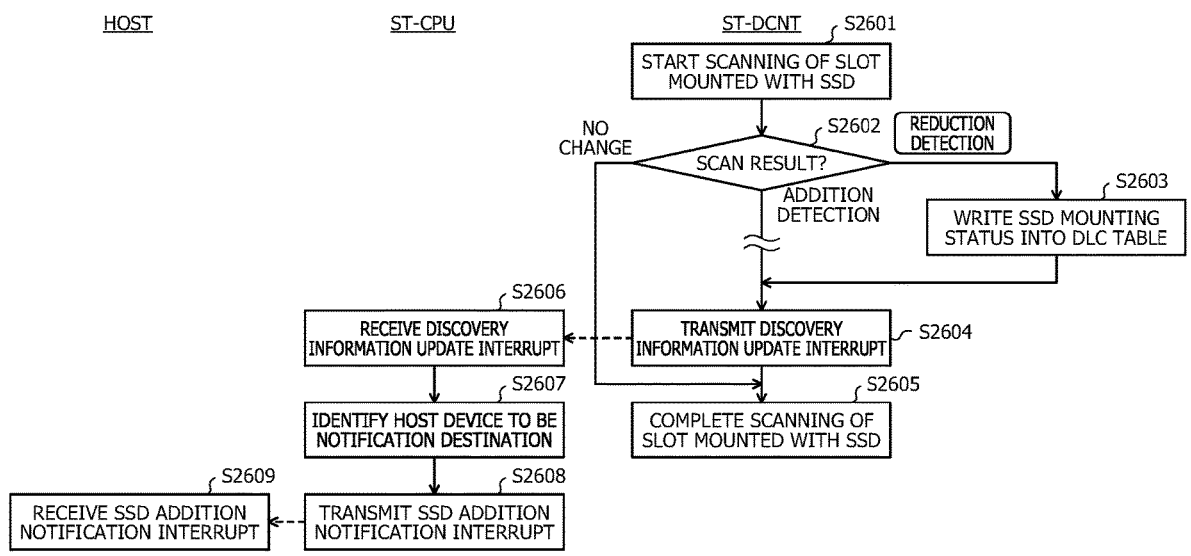
FIG. 26 is a sequence diagram illustrating one example of a reduction processing procedure.

FIG. 26 is a sequence diagram illustrating one example of the reduction processing procedure. In FIG. 26, the ST-DCNT 122 starts scanning of the slot 150 mounted with the SSD 160 (step S2601). Here, the ST-DCNT 122 determines that the scan result is reduction detection (step S2602). Therefore, the ST-DCNT 122 shifts to the processing of step S2603.

In step S2603, the ST-DCNT 122 writes a mounting status of the SSD 160 into the DLC table 600 (step S2603). Next, the ST-DCNT 122 transmits a discovery information update interrupt containing the DLC table 600, to the ST-CPU 121 (step S2604). Then, the ST-DCNT 122 completes scanning of the slot 150 mounted with the SSD 160 (step S2605).

Whereas, the ST-CPU 121 receives the discovery information update interrupt (step S2606). Next, the ST-CPU 121 identifies the host device 102 to be a notification destination, on the basis of the NA table 500 (step S2607). Then, the ST-CPU 121 transmits an addition notification interrupt of the SSD 160 to the host device 102 to be the notification destination (step S2608).

Whereas, the host device 102 receives the addition notification interrupt of the SSD 160 (step S2609). Then, the storage control system 100 ends the reduction processing. This allows the storage control system 100 to appropriately enable identification of the slot 150 from which the SSD 160 is reduced, in response to reduction in the SSD 160.

(One Example of Updating DLC Table 600 in Response to Replacement of SSD 160)

Next, with reference to FIGS. 27 to 30, a description is given to one example in which the storage control device 101 updates the DLC table 600 in response to replacement of the SSD 160 in an operation example.

FIGS. 27 to 30 are explanatory views illustrating one example of updating the DLC table 600 in response to replacement of the SSD 160. In FIG. 27, it is assumed that the storage control device 101 has already set in the NA table 500 that the host device 102 with HOSTNQN=HOST1 . . . is a notification destination, on the basis of an operation input by the administrator. When the SSD 160 is reduced, the host device 102 that is set with YES in the NA table 500 and is identified by Associated HOSTNQN is to be the notification destination.

Furthermore, it is assumed that the SSD 160 is already mounted in the slot 150 of Slot #0, and the SSD 160 is already mounted in the slot 150 of Slot #1. It is assumed that the storage control device 101 has already set various types of information indicating a mounting status of the SSD 160, in the DLC table 600. It is assumed that the host device 102 has already assigned a Logical Drive to the SSD 160. It is assumed that the host device 102 has already set a result of assigning the Logical Drive to the SSD 160, in the ND table 700. Next, a description of FIG. 28 will be made.

In FIG. 28, the storage control device 101 starts scanning as to whether or not the SSD 160 has been mounted in the slot 150. As a result of scanning, the storage control device 101 detects that the SSD 160 has been reduced from the slot 150 of Slot #1. The storage control device 101 sets the mounting status of the slot 150, in the DLC table 600. The storage control device 101 sets, to None, for example, SSD Installation corresponding to the slot 150 from which the SSD 160 is reduced.

When the SSD 160 is reduced, the storage control device 101 transmits a notification that the SSD 160 has been reduced, to the host device 102 that is set as the notification destination and is identified by the Associated HOSTNQN. When the SSD 160 is reduced, the storage control device 101 does not have to provide the host device 102 with a virtual SUBNQN and a virtual CNTLID corresponding to the slot 150 from which the SSD 160 is reduced. Next, a description of FIG. 29 will be made.

In FIG. 29, the storage control device 101 starts scanning as to whether or not the SSD 160 has been mounted in the slot 150. As a result of scanning, the storage control device 101 detects that the SSD 160 has been newly added to the slot 150 of Slot #1. The storage control device 101 sets a network address corresponding to the slot 150, in the SSD 160 added to the slot 150. The storage control device 101 sets the mounting status of the slot 150, in the DLC table 600. Next, a description of FIG. 30 will be made.

In FIG. 30, the storage control device 101 collects discovery information and identification information from the SSD 160 added to the slot 150. The storage control device 101 sets the collected discovery information and identification information in the DLC table 600. The storage control device 101 sets, for example, an actual SUBNQN and an actual CNTLID in the DLC table 600. At this time, the virtual SUBNQN and the virtual CNTLID are not updated and are unchanged.

The storage control device 101 transmits a notification that the SSD 160 has been added, to the host device 102 set as the notification destination. Furthermore, on the basis of the DLC table 600, the storage control device 101 transmits an addition notification interrupt containing a virtual SUBNQN and a virtual CNTLID corresponding to the slot 150 added with the SSD 160, to the host device 102.

In this way, the storage control device 101 may appropriately associate the virtual SUBNQN and the virtual CNTLID with the actual SUBNQN and the actual CNTLID, in response to replacement of the SSD 160. Therefore, the storage control device 101 may appropriately enable conversion of the virtual SUBNQN and the virtual CNTLID into and from the actual SUBNQN and the actual CNTLID, in response to replacement of the SSD 160.

Furthermore, the storage control device 101 enables the host device 102 to avoid recognizing the actual SUBNQN and the actual CNTLID of the SSD 160 before and after replacement of the SSD 160. The host device 102 can continuously use the virtual SUBNQN and the virtual CNTLID. Therefore, the storage control device 101 may reduce a work error and a work load on the operator and the administrator when the SSD 160 is replaced.

(Replacement Processing Procedure)

Next, with reference to FIGS. 31 and 32, one example of a replacement processing procedure executed by the storage control system 100 will be described. The replacement processing realizes various operations of the storage control device 101 and the host device 102 illustrated in FIGS. 27 to 30.

Figure 31:
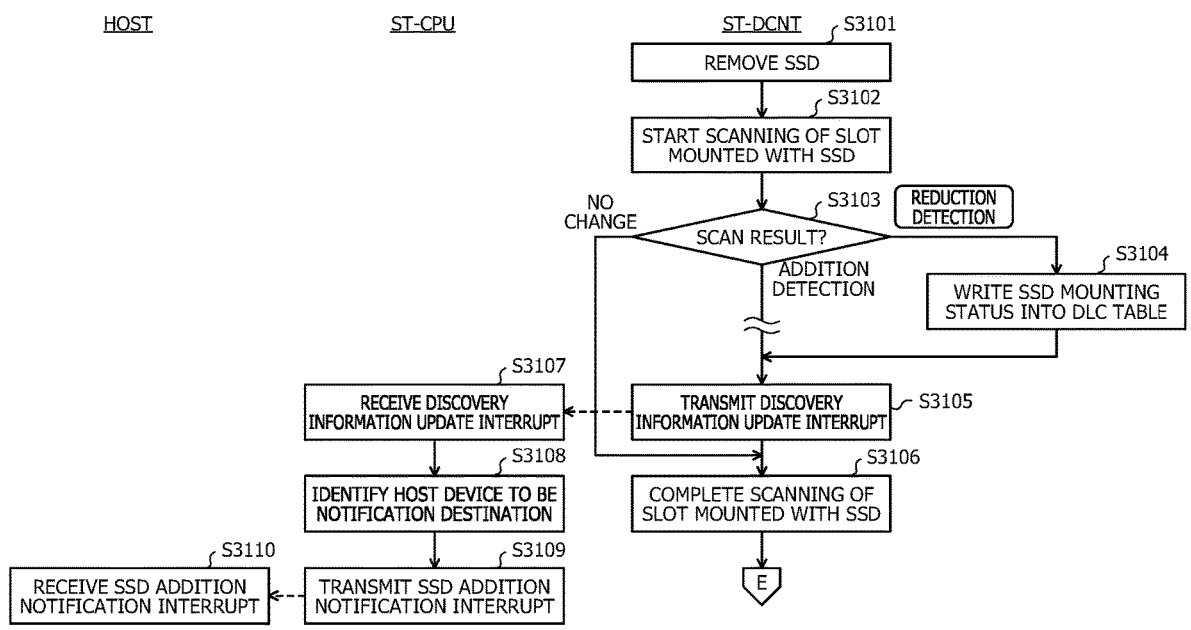
FIG. 31 is a sequence diagram (No. 1) illustrating one example of a replacement processing procedure.
Figure 32:
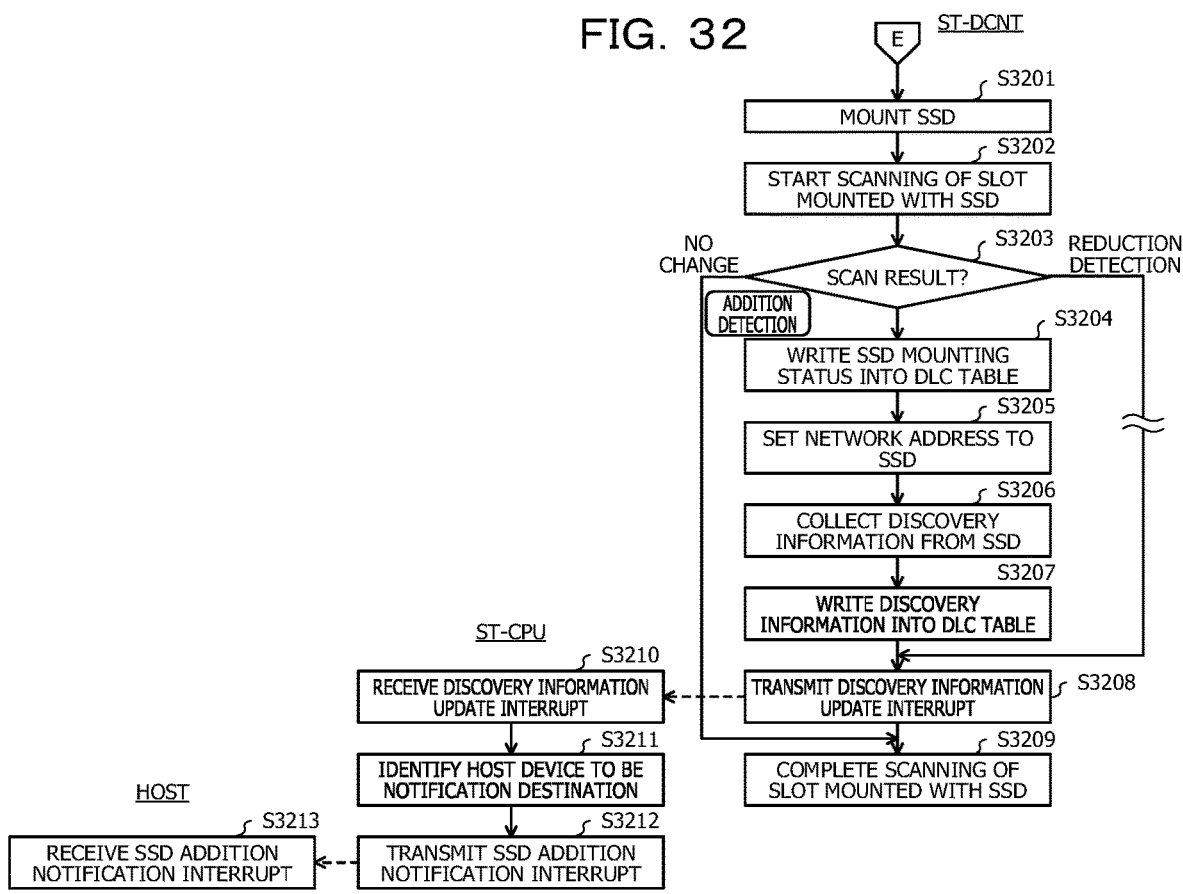
FIG. 32 is a sequence diagram (No. 2) illustrating one example of the replacement processing procedure.

FIGS. 31 and 32 are sequence diagrams illustrating one example of the replacement processing procedure. In FIG. 31, a storage administrator removes the SSD 160 from the slot 150 of the storage control device 101 (step S3101).

The ST-DCNT 122 starts scanning the slot 150 mounted with the SSD 160 (step S3102). Here, the ST-DCNT 122 determines that the scan result is reduction detection (step S3103). Therefore, the ST-DCNT 122 shifts to the processing of step S3104.

In step S3104, the ST-DCNT 122 writes a mounting status of the SSD 160 into the DLC table 600 (step S3104). Next, the ST-DCNT 122 transmits a discovery information update interrupt containing the DLC table 600, to the ST-CPU 121 (step S3105). Then, the ST-DCNT 122 completes scanning of the slot 150 mounted with the SSD 160 (step S3106). Thereafter, the storage administrator performs the operation of step S3101 of FIG. 31, and then the ST-DCNT 122 shifts to the processing of step S3202 of FIG. 32.

Whereas, the ST-CPU 121 receives the discovery information update interrupt (step S3107). Next, the ST-CPU 121 identifies the host device 102 to be a notification destination, on the basis of the NA table 500 (step S3108). Then, the ST-CPU 121 transmits an addition notification interrupt of the SSD 160 to the host device 102 to be the notification destination (step S3109).

Whereas, the host device 102 receives the addition notification interrupt of the SSD 160 (step S3110). Next, a description of FIG. 32 will be made.

In FIG. 32, a storage administrator mounts the SSD 160 to the slot 150 of the storage control device 101 (step S3201).

The ST-DCNT 122 starts scanning the slot 150 mounted with the SSD 160 (step S3202). Here, the ST-DCNT 122 determines that the scan result is addition detection (step S3203). Therefore, the ST-DCNT 122 shifts to the processing of step S3204.

In step S3204, the ST-DCNT 122 writes a mounting status of the SSD 160 into the DLC table 600 (step S3204). Next, the ST-DCNT 122 sets a network address to the detected SSD 160 (step S3205). Then, the ST-DCNT 122 collects discovery information from the detected SSD 160 (step S3206).

Next, the ST-DCNT 122 writes the collected discovery information into the DLC table 600 (step S3207). Then, the ST-DCNT 122 transmits a discovery information update interrupt containing the DLC table 600, to the ST-CPU 121 (step S3208). Thereafter, the ST-DCNT 122 completes scanning of the slot 150 mounted with the SSD 160 (step S3209).

Whereas, the ST-CPU 121 receives the discovery information update interrupt (step S3210). Next, the ST-CPU 121 identifies the host device 102 to be a notification destination, on the basis of the NA table 500 (step S3211). Then, the ST-CPU 121 transmits an addition notification interrupt of the SSD 160 to the host device 102 to be the notification destination (step S3212).

Whereas, the host device 102 receives the addition notification interrupt of the SSD 160 (step S3213). Then, the storage control system 100 ends the replacement processing. This allows the storage control system 100 to reduce the work load on the operator and the administrator when the SSD 160 is replaced.

As described above, according to the storage control device 101, it is possible to associate and store, in the storage unit 200, actual identification information unique to a recording medium mounted in the slot 210, with virtual identification information that is commonly assigned to the recording medium mounted in the slot 210. According to the storage control device 101, when a command containing virtual identification information is received from the host device 102, the virtual identification information contained in the received command may be converted into actual identification information stored in the storage unit 200, in association with the virtual identification information. According to the storage control device 101, the converted command may be transmitted to a control device that controls access to a recording medium mounted in the slot 210. According to the storage control device 101, when a response containing actual identification information is received from the control device, the actual identification information contained in the received response may be converted into virtual identification information stored in the storage unit 200, in association with the actual identification information. According to the storage control device 101, the converted response may be transmitted to the host device 102. According to the storage control device 101, it is possible to detect that a recording medium has been removed from the slot 210 and another recording medium has been mounted. According to the storage control device 101, in a case of detecting, actual identification information that is unique to a recording medium removed from the slot 210 and is stored in the storage unit 200 in association with virtual identification information may be updated to actual identification information unique to a recording medium mounted in the slot 210. This allows the storage control device 101 to enable the host device 102 to continue to use the recording medium even if the host device 102 does not recognize actual identification information unique to the recording medium before and after replacement of the recording medium. Therefore, the storage control device 101 may reduce a work error and a work load on the operator and the administrator when the recording medium is replaced.

According to the storage control device 101, when it is detected that a recording medium has been removed from the slot 210, a notification that the recording medium has been removed from the slot 210 may be transmitted to the host device 102. This allows the storage control device 101 to enable the host device 102 to recognize that the recording medium has been removed from the slot 210.

According to the storage control device 101, when it is detected that a recording medium has been mounted in the slot 210, a notification that the recording medium has been mounted in the slot 210 may be transmitted to the host device 102. This allows the storage control device 101 to enable the host device 102 to recognize that the recording medium has been mounted in the slot 210.

According to the storage control device 101, it is possible to associate and store, in the storage unit 200, virtual identification information, with actual identification information and identification information of a control device that controls access to a recording medium mounted in the slot 210. According to the storage control device 101, it is possible to detect that a recording medium has been removed from the slot 210 and another recording medium has been mounted. According to the storage control device 101, in a case of detecting, actual identification information that is unique to a recording medium removed from the slot 210 and is stored in the storage unit 200 may be updated to actual identification information unique to a recording medium mounted in the slot 210. According to the storage control device 101, in a case of detecting, identification information that is stored in the storage unit 200 and is of a control device that controls access to a removed recording medium may be updated to identification information of a control device that controls access to a mounted recording medium. This allows the storage control device 101 to enable the host device 102 to continue to use the recording medium, even if the host device 102 does not recognize the identification information of a control device that controls access to the recording medium before and after replacement of the recording medium. Therefore, the storage control device 101 may reduce a work error and a work load on the operator and the administrator when the recording medium is replaced.

According to the storage control device 101, it is possible to associate and store, in the storage unit 200, actual identification information, with a predetermined address commonly assigned to the recording medium mounted in the slot 210 and provided to the host device 102 and virtual identification information. This allows the storage control device 101 to manage the predetermined address.

According to the storage control device 101, when a command that does not contain virtual identification information is received from the host device 102, the received command may be transmitted to a control device that controls access to a recording medium mounted in the slot 210. According to the storage control device 101, when a response that does not contain actual identification information is received from the control device, the received response may be transmitted to the host device 102. This allows the storage control device 101 to appropriately relay commands and responses between the host device 102 and the control device.

According to the storage control device 101, actual identification information unique to a recording medium mounted in the slot 210 may be inquired at every predetermined timing. According to the storage control device 101, on the basis of a comparison result of a result of a current inquiry with a result of a previous inquiry, it is possible to detect that a recording medium has been removed from the slot 210 or that a recording medium has been mounted in the slot 210. This allows the storage control device 101 to recognize a mounting status of the recording medium on the slot 210.

According to the storage control device 101, when it is detected that a recording medium has been mounted in the slot 210, it is possible to associate and store, in the storage unit 200, the virtual identification information, with actual identification information that is unique to the recording medium mounted in the slot 210 and is obtained as a result of the inquiry. According to the storage control device 101, when it is detected that a recording medium has been removed from the slot 210, it is possible to delete, from the storage unit 200, actual identification information that is unique to the recording medium removed from the slot 210 and is stored in the storage unit 200, in association with the virtual identification information. This allows the storage control device 101 to correctly update the storage contents of the storage unit 200.

According to the storage control device 101, NVMe technology may be utilized. This allows the storage control device 101 to utilize actual identification information unique to a recording medium defined in the NVMe specification.

According to the storage control device 101, it is possible to convert actual identification information that is unique identification information assigned to a recording medium at the time of manufacturing the recording medium and is unique to a recording medium mounted in the slot 210, into virtual identification information. This allows the storage control device 101 to convert an actual SUBNQN into a virtual SUBNQN.

According to the storage control device 101, a command containing virtual identification information as an access destination may be received from the host device 102. According to the storage control device 101, the virtual identification information contained in the received command may be converted into actual identification information stored in the storage unit 200, in association with the virtual identification information. According to the storage control device 101, the converted command may be transmitted to a control device that controls access to a recording medium mounted in the slot 210. This allows the storage control device 101 to accurately determine a command to be a conversion target.

Note that the storage control method described in the present embodiment may be realized by executing a program prepared in advance on the storage control device 101. The storage control program described in the present embodiment is executed by being recorded on a computer-readable recording medium and being read from the recording medium by the computer. The recording medium is a hard disk, a flexible disk, a compact disc (CD)-ROM, a magneto-optical disc (MO), a digital versatile disc (DVD), or the like. Furthermore, the storage control program described in the present embodiment may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A storage control device, comprising:
a memory; and
a processor coupled to the memory and the processor configured to:
   store identification information unique to a first recording device mounted in a slot, and virtual identification information assigned to the first recording device and transmitted to a host device,
   when receiving a first command that includes the virtual identification information from the host device, generate a second command that includes the identification information by converting the virtual identification information included in the received first command into the identification information stored with being associated with the virtual identification information, transmit, to a control device which controls access to the first recording device, the generated second command, when receiving a first response that includes the identification information from the control device, generate a second response that includes the virtual identification information by converting the identification information included in the received first response into the virtual identification information stored with being associated with the identification information, transmit, to the host device, the generated second response, when detecting that the first recording device is removed from the slot and a second recording device is mounted in the slot, change from the identification information of the first recording device associated with the virtual identification information, into second identification information unique to the second recording device, when a command that does not contain the virtual identification information is received from the host device, transmit the received command to the control device, and when a response that is for the transmitted command and does not contain the identification information is received from the control device, transmit the received response to the host device.

2. The storage control device according to claim 1, wherein the processor configured to transmit, to the host device, a notification that the first recording device has been removed from the slot, when it is detected that the first recording device has been removed from the slot.

3. The storage control device according to claim 1, wherein the processor configured to transmit, to the host device, a notification that the second recording device has been mounted in the slot, when it is detected that the second recording device has been mounted in the slot.

4. The storage control device according to claim 1, wherein the processor configured to store identification information unique to a recording device mounted in the slot with a predetermined address that is commonly assigned to a recording device mounted in the slot and is provided to the host device, and the virtual identification information.

5. The storage control device according to claim 1, wherein the processor configured to:
inquire identification information unique to a recording device mounted in the slot at every predetermined timing, and
detect that a recording device has been removed from the slot or that a recording device has been mounted in the slot, based on a comparison result of a result of a current inquiry with a result of a previous inquiry.

6. The storage control device according to claim 1, wherein the processor configured to:
store the virtual identification information, with identification information that is obtained as a result of an inquiry and is unique to a recording device mounted in the slot, when it is detected that a recording device has been mounted in the slot, and
delete actual identification information that is stored in association with the virtual identification information and is unique to a recording device removed from the slot, when it is detected that a recording device has been removed from the slot.

7. A non-transitory computer-readable storage medium storing a program that causes a computer to execute a process, the process comprising:
storing identification information unique to a first recording device mounted in a slot, and virtual identification information assigned to the first recording device and transmitted to a host device;
when receiving a first command that includes the virtual identification information from the host device, generating a second command that includes the identification information by converting the virtual identification information included in the received first command into the identification information stored with being associated with the virtual identification information;
transmitting, to a control device which controls access to the first recording device, the generated second command;
when receiving a first response that includes the identification information from the control device, generating a second response that includes the virtual identification information by converting the identification information included in the received first response into the virtual identification information stored with being associated with the identification information;
transmitting, to the host device, the generated second response;
when detecting that the first recording device is removed from the slot and a second recording device is mounted in the slot, changing from the identification information of the first recording device associated with the virtual identification information, into second identification information unique to the second recording device;
when a command that does not contain the virtual identification information is received from the host device, transmitting the received command to the control device; and
when a response that is for the transmitted command and does not contain the identification information is received from the control device, transmitting the received response to the host device.

8. A storage control method executed by a computer, the method comprising:
storing identification information unique to a first recording device mounted in a slot, and virtual identification information assigned to the first recording device and transmitted to a host device;
when receiving a first command that includes the virtual identification information from the host device, generating a second command that includes the identification information by converting the virtual identification information included in the received first command into the identification information stored with being associated with the virtual identification information;
transmitting, to a control device which controls access to the first recording device, the generated second command;
when receiving a first response that includes the identification information from the control device, generating a second response that includes the virtual identification information by converting the identification information included in the received first response into the virtual identification information stored with being associated with the identification information;
transmitting, to the host device, the generated second response;

when detecting that the first recording device is removed from the slot and a second recording device is mounted in the slot, changing from the identification information of the first recording device associated with the virtual identification information, into second identification information unique to the second recording device;

when a command that does not contain the virtual identification information is received from the host device, transmitting the received command to the control device; and when a response that is for the transmitted command and does not contain the identification information is received from the control device, transmitting the received response to the host device.

* * * * *